United States Patent [19]
Bassett

[11] Patent Number: 5,685,245
[45] Date of Patent: Nov. 11, 1997

[54] PLANTER UNIT

[76] Inventor: James H. Bassett, 812 Somonauk St., Sycamore, Ill. 60178

[21] Appl. No.: 367,990

[22] Filed: Jan. 3, 1995

Related U.S. Application Data

[63] Continuation-in-part of Ser. No. 73,573, Jun. 8, 1993, and a continuation-in-part of Ser. No. 97,977, Jul. 27, 1993, Pat. No. 5,499,683, and a continuation-in-part of Ser. No. 97,978, Jul. 27, 1993, Pat. No. 5,479,992, and a continuation-in-part of Ser. No. 189,840, Feb. 1, 1994, abandoned.

[51] Int. Cl.$^6$ .................................................... A01C 7/06
[52] U.S. Cl. .................... 111/62; 111/927; 172/484; 172/624.5; 172/662; 172/683
[58] Field of Search ............................... 111/52, 59, 62, 111/70, 927; 172/484, 624.5, 643, 662, 668, 481, 466, 674, 683

[56] References Cited

U.S. PATENT DOCUMENTS

| 2,593,176 | 4/1952 | Patterson | 172/481 X |
|---|---|---|---|
| 2,715,286 | 8/1955 | Saveson | 172/481 X |
| 4,142,589 | 3/1979 | Schlagenhauf | 172/624.5 X |
| 4,307,674 | 12/1981 | Jennings et al. | 111/927 X |
| 4,359,101 | 11/1982 | Gagnon | 172/484 X |
| 4,461,355 | 7/1984 | Peterson et al. | 172/624.5 X |
| 4,671,193 | 6/1987 | States | 111/927 X |
| 4,726,304 | 2/1988 | Dreyer et al. | 111/927 X |
| 4,744,316 | 5/1988 | Lienemann et al. | 172/624.5 X |
| 5,351,635 | 10/1994 | Hulicsko | 172/643 X |
| 5,398,771 | 3/1995 | Hornung et al. | 172/484 X |

FOREIGN PATENT DOCUMENTS

| 2402411 | 7/1975 | Germany | 172/484 |
|---|---|---|---|
| 625648 | 9/1978 | U.S.S.R. | 111/62 |
| 2056238 | 3/1981 | United Kingdom | 111/59 |

*Primary Examiner*—Terry Lee Melius
*Assistant Examiner*—Christopher J. Novosad
*Attorney, Agent, or Firm*—Arnold, White & Durkee

[57] ABSTRACT

A planter row unit having a frame with a first unitary rigid plate and structure for attaching a soil engaging component in an operative position on the first unitary rigid plate and first structure cooperating between a towing frame that is movable in a forward towing direction and the first unitary rigid plate for attaching the first unitary rigid plate to a towing frame so that the first unitary rigid plate a) follows forward movement of the towing frame to which the first unitary rigid plate attaches and b) is movable vertically relative to a towing frame to which the first unitary rigid plate attaches to allow the first unitary rigid plate to move conformingly over uneven terrain.

6 Claims, 10 Drawing Sheets

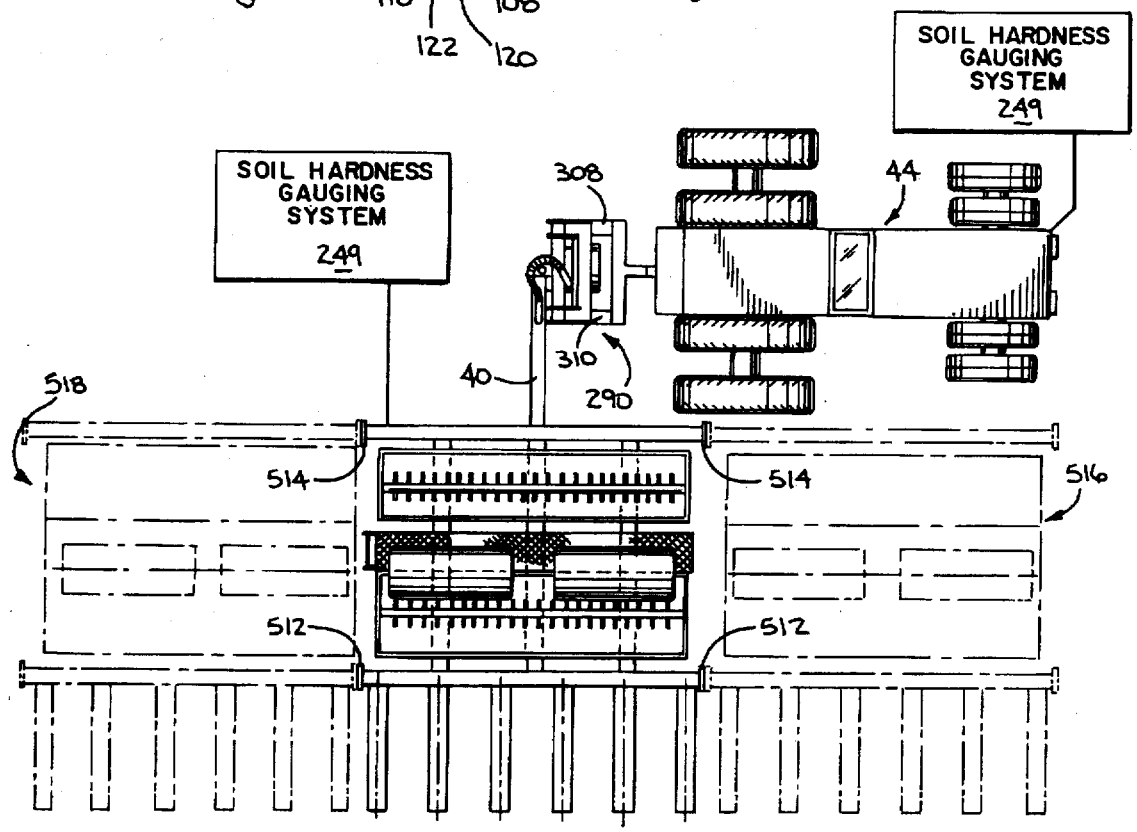
FIG. 7
FIG. 8
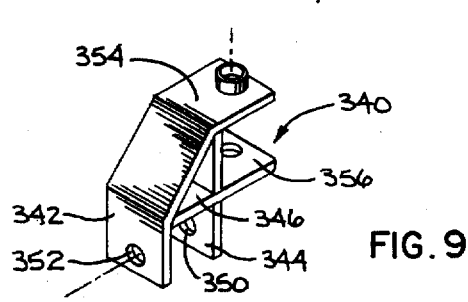
FIG. 9

PLANTER UNIT

CROSS REFERENCE

This application is a Continuation-In-Part of my co-pending applications Ser. No. 08/073,573, filed on Jun. 8, 1993, entitled "Apparatus For Preparing Soil for the Placement of Seed and Additives"; Ser. No. 08/097,977, filed on Jul. 27, 1993 entitled "Soil Treating System With Hydraulically Actuated Implement Controller", now U.S. Pat. No. 5,499,683; Ser. No. 08/097,978, filed on Jul. 27, 1993 entitled "Agricultural Implement Controller to Compensate for Soil Hardness Variation", now U.S. Pat. No. 5,479,992; and Ser. No. 08/189,840, Feb. 1, 1994 entitled "Mechanism for Planting Agricultural Seed", now abandoned.

BACKGROUND OF THE INVENTION

1. Field of the Invention

This invention relates to planter units of the type used to continuously resituate residue on soil, cultivate the soil, apply additives such as fertilizer and insecticides, and plant seed.

2. Background Art

The basic construction of planter units has remained the same for decades. While many significant improvements have been made, the end result of these developments has been planter units that are often very complicated, expensive, and with operational limitations and drawbacks. One observing conventional planting procedures may witness massive equipment with a maze of electric and hydraulic lines running throughout the unit to supply various components thereon.

After a multitude of redesigns over the past several decades, it still remains a common practice to design these planters with a relatively heavy towing frame that is drawn by a towing vehicle. The frame is supported on a wheeled carriage which can be drawn through a field to allow continuous soil treating/planting operations to be performed. The frame defines a support for additive supplies and electric and hydraulic equipment utilized to direct the additive and seed into underlying soil. The frame supports upstream wheels and knives which work the soil.

In a trailing position on the frame are laterally spaced row units with additional soil working tools and structure for continuously parting the soil in a seed row, placing the seed therein, and redistributing soil over the planted seeds. These row units may also be equipped to deliver an additive to the underlying soil.

The row unit is in essence the heart of the planter and is relied upon to place seed at uniform intervals and at a uniform depth, for consistent and optimal crop yield. The row units are vertically movable relative to the frame to which they attach and have gauge wheels which ride along underlying soil to maintain the row units at a desired height. The gauge wheels are in close proximity to a "V-opener", which consists of a pair of angled disks which part the soil to planting depth.

The farmer may encounter different soil conditions from year to year and even week to week during the planting season. In soft soils, the row units tend to sink into the soil whereby the seed depth increases. In very hard soil, the V-opener may simply skim the surface without penetrating to the necessary depth.

Heretofore, row units have been made to have a light construction i.e. on the order of 300 pounds. The variation in soil conditions is dealt with by physically adding weights to the units in hard soil conditions. It is also known to bias the row units downwardly with a variable force through a spring acting between the frame and row unit.

Similarly, upstream additive applicator assemblies utilizing coulter wheels may require as much as 400–500 pounds of down pressure each to penetrate hardened soil to the desired depth. The same solution i.e. downward force application using weights and spring bias, has been practiced to overcome the penetration problems on these assemblies.

The use of a downward, augmenting spring force has a serious drawback. In very hard soil conditions, it may be necessary to exert a force of 200–300 pounds on each planter unit to effect the desired penetration. This several hundred pound force is multiplied by the 6, 12, or more, row units on the planter, with the result being that a very substantial lifting force is produced on the frame, which tends to effectively "lighten" the frame. In severe soil conditions, the wheels on the carriage may be prone to completely lifting off the underlying soil.

In severe conditions, the weight of the frame may be effectively lessened to the point that the carriage wheels slip. This is a serious problem in many planter constructions, in which the carriage wheels drive structure that meters discharge of seed and/or additive from bulk supplies thereof.

For example, it is also common to use the carriage wheels as a gauge for travel distance and speed. That is, delivery rates of seed and additive may be tied to the rotation of the carriage wheels. Slippage of the wheels gives a false reading of distance travelled, with the result being that insufficient quantities of seed and/or additive may be delivered to the soil.

The use of weights, as an alternative to the spring bias, overcomes the problem of frame "lightening". However, it can be a back breaking chore, and it is obviously inconvenient, to have to separately apply weights to each row unit as conditions dictate. This is particularly burdensome since soil conditions may vary not only from day to day but from area to area on the same field. Low lying, poorly draining areas tend to retain water and stay soft whereas elevated and well drained terrain tends to pass moisture and harden.

The inventor herein has developed structure for continuously testing the condition of the soil and automatically adjusting the down pressure through separate cylinders acting between the frame and row units. While this alleviates the inconvenience of individual spring adjustment and weight addition, the problem of frame "lightening" must still be contended with.

Another problem with light row units, particularly when used in soft soil conditions in which they are unweighted and unbiased, is that the row units are inherently unstable and tend to bounce at higher operating speeds, as when encountering contoured terrain and/or obstructions. The result is that seed and/or additive may be introduced at different depths and potentially even out of line with the seed slots. Inconsistent crop yield over a field may result. To alleviate this problem, conventional planter units are normally operated at low speeds, i.e. in the range of 4–5 miles per hour.

Because these planter units are operated at such low speeds, for efficiency purposes, it is common to mount row units in multiples of 12 or more on the frame. This adds considerably to the size and cost of the planter unit and necessitates disassembly and/or folding of the planter unit for purposes of transportation and storage.

Another problem with planters that vary rate of seed and additive delivery with the speed of forward movement of the planter unit is that it is difficult to construct a reliable power transmission unit between one of the ground engaging wheels on the carriage and a rotary unit that operates one or more metering units for the seed and/or additive. This is particularly true in high residue environments.

One typical system employs a laterally extending takeoff shaft to operate a plurality of metering units. The takeoff shaft is driven by endless chains which are each trained around a sprocket on the takeoff shaft and a sprocket on an extension of the hub on a carriage wheel. Since the carriage wheels normally have a relatively small diameter, the sprocket on the hub extension may be driven through a substantial amount of residue. The residue picked up between the chain and sprockets may ultimately cause the chain to jam and possibly break.

Further, the tension on the chains must be constantly monitored. The use of a tensioner and periodic adjustment may be required.

Another known system to vary the speed of the takeoff shaft uses a separate follower wheel which is biased against and driven by the peripheral surface of a carriage wheel. This follower wheel has a rotational axis that is substantially parallel to that of the carriage wheel. A substantial downward pressure is required to be applied to the follower wheel to allow it to rotate without slipping relative to the associated carriage wheel.

With this system, the accumulation of residue on the carriage wheel may change the frictional characteristics thereof so that slippage of the follower wheel relative to the carriage wheel occurs. Further, the buildup of residue on the carriage wheel may cause it to have an effectively larger diameter peripheral surface that is traversed by the follower wheel so that a false "reading" of the carriage speed results.

For want of a better system for positively and reliably transmitting a rotative force from the carriage wheels to a takeoff shaft, the above problems in the prior art have been contended with.

Another problem with prior art planters is that the row units tend to skew and shift relative to the mounting frame to which they attach, particularly when drawn through hardened soil. Lateral shifting may cause variation in spacing between the seed rows. The unwanted pivoting of the units about the fore and aft axis may result in the improper formation of the seed slot and/or misplacement of seed and/or additive.

This problem is even more significant as it affects closing of the seed slot. If the row unit shifts, the soil may not be placed properly over the seed slot to completely cover the seed. In a worse case, the closing wheel may be driven right through the seed slot. Improperly covered seed will not germinate. It is not inconceivable that an entire field would be planted with one or more of the row units skewed to the extent that germination does not take place in the affected rows.

A further problem exists with prior art planters using accessories requiring an hydraulic or electric supply. It is common to place these accessories on the planter a substantial distance downstream away from the towing vehicle. This necessitates running hydraulic and/or electric lines from a supply, located on the drawing vehicle, driven by the power take off on the drawing vehicle. The components are subjected to dust and debris churned up by the planter unit at the leading portion thereof.

It is also known to mount the supply mechanism on the tongue of the planter draw bar, to be in close proximity to the power take off at the point of hitching on the towing vehicle.

A drive shaft connects between the supply and the power take off. However, this connection is functional through an angular range of less than 90° between the length of the planter and the fore and aft axis of the towing vehicle. If too sharp a turn is negotiated, the drive shaft may bind. This type of system thus requires a relatively large, minimum turning radius, the result of which may be that extra passes or a different soil treating/planting pattern may be necessitated.

A still further problem with conventional type planters resides in the area of the closing wheel. One conventional closing wheel employs angled, rotary wheels downstream of the area of seed introduction to distribute the soil parted by the opener back over the seed slot to produce a coveting blanket of soil.

It is common to attach these wheels to a pivoting arm and produce a fixed or variable downward bias on this arm through forced pivoting of the arm to assure that a sufficient downward force is produced to deposit the soil effectively over the open seed slot. This spring bias force is commonly applied in a line that resides beneath the pivot axis for the arm. This biasing structure, which may be in the form of a coil spring, is thus exposed to corrosive chemicals applied by the planter and may also be dragged through underlying soil and debris. Over time, this may ultimately alter the operating characteristics of the closing wheels or, in a worst case, cause a complete failure of the biasing mechanism.

Another problem with conventional row units is that assembly and disassembly of the various components thereon is often complicated. Because the mounting framework for the components on some row units is relatively light weight, the components may be tied in from opposite sides thereof. Servicing of the row unit may require the repair person to go back and forth on opposite sides of the row unit to gain the necessary access.

At the same time, it is difficult to construct the light weight, conventional frame in such a manner that the various accessories thereon are consistently and accurately oriented with respect to the frame. For example, the disks defining the V-opener are ideally toed in at the front and bottom at a precise angle with respect to each other, and the row unit framework, to optimize the seed slot configuration. It is difficult on a light frame to mount the V-opener disks precisely at the desired angle and at the same time maintain this angle under the severe conditions encountered in planting operations.

A further problem with some conventional planter units is that the gauge wheels on the row units are advanced by being drawn in a trailing direction from a carrying member on the row unit framework. This carrying member is prone to picking up dirt and debris which may interfere with the free rotation of the gauge wheels and/or find its way underneath the gauge wheels, with the result being that the row unit elevates as the dirt and/or debris pass under the wheels.

A still further problem with some conventional planter units is that seed and fertilizer are often introduced at a rate determined by the speed of the carriage. Recent developments in mapping technology permit running yield monitoring and mapping to be performed over an entire field. By analyzing the crop yield, the farmer is able to customize treatment throughout the field, as by varying the rate of delivery of additive. This mapping technique relies heavily on accurate data recording which in turn is dependent on accurate tracking when the yield data is recorded and the customized treatment of the soil occurs using this accumulated data. False readings may completely throw off the mapping pattern and make this site specific forming technique totally ineffective.

Another problem with conventional drawn planter units is that they require propulsion from a separate towing unit i.e. a tractor. Consequently, the towing vehicle is monopolized during the entire time that the planter unit is in operation. Thus the various tasks in a given field must be performed in sequence, as opposed to performing multiple tasks simultaneously.

SUMMARY OF THE INVENTION

In one form of the invention, a planter row unit is provided having a frame with a first unitary rigid plate, structure for attaching a soil engaging component in an operative position on the first unitary rigid plate, and first structure cooperating between a towing frame that is movable in a forward towing direction and the first unitary rigid plate for attaching the first unitary rigid plate to a towing frame so that the first unitary rigid plate a) follows forward movement of the towing frame to which the first unitary rigid plate attaches and b) is movable vertically relative to a towing frame to which the first unitary rigid plate attaches to allow the first unitary rigid plate to move conformingly over uneven terrain.

The first cooperating structure may be in the form of a link that is pivotably connected to each of the first unitary rigid plate and towing frame. The first cooperating structure can also include a second link pivotably connected to each of the first unitary rigid plate and a towing frame to define a parallel link arrangement. Biasing structure can be provided between links.

The fast unitary rigid plate may be a single piece of metal having a thickness on the order of 0.75 to 1.5 inches.

With the first unitary rigid plate having a flat construction with oppositely facing flat surfaces, structure can be provided for conveniently attaching a soil engaging component to the first unitary rigid plate at one of the laterally oppositely facing surfaces.

The planter row unit has a top and bottom and a front and rear and the first unitary rigid plate extends continuously over at least one half the distance between at least one of a) the top and bottom of the planter row unit and b) the front and rear of the planter row unit.

Releasable latch structure can be provided cooperating between the first unitary rigid plate and a towing frame for releasably maintaining the first unitary rigid plate in an elevated position relative to a towing frame. The latch structure may include a pivoting latch arm on one of the first unitary rigid plate and towing frame and a latching pin on the other of the unitary rigid plate and a towing frame to be engaged by the latch arm to thereby maintain the unitary rigid plate in the elevated position.

The frame may further include a second unitary rigid plate that is rigidly connected to the first unitary rigid plate with the first and second unitary rigid plates in assembled relationship. The second unitary rigid plate may have structure thereon for attaching one or more a soil engaging components in an operative position thereon.

In one form, the unitary rigid plates have a longer dimension and a transverse shorter dimension, with the longer dimensions of the first and second unitary rigid plates being transverse to each other with the first and second unitary rigid plates in assembled relationship.

In one form, the first and second unitary rigid plates define an overall T shape, with the first unitary rigid plate defining a vertically extending cross bar and the second unitary rigid plate defining a stem extending in a fore and aft direction.

The second plate can likewise be defined by a flat sheet of metal with oppositely facing flat surfaces and with the first and second unitary rigid plates in assembled relationship, the flat surfaces on the first and second unitary rigid plates are substantially parallel to each other and extend in a vertical direction.

The first and second unitary rigid plates, in the assembled relationship, may define a space therebetween to accommodate row unit components, such as a supply conduit.

The second unitary rigid plate may have a depending leg to which a soil engaging component is attached.

More than one soil engaging component can be attached to each of the first and second unitary rigid plates. The components can be spaced in a fore and aft direction.

The unitary rigid plates can also be constructed to attach one or more of the soil engaging components selectively in different positions that are spaced from each other either vertically or in a fore and aft direction.

The soil engaging components can be gauge wheels, toothed wheels, coulter wheels, or other known rotatable and non-rotatable soil engaging components.

In one form, structure is provided, acting between the towing frame and the planter row unit, to effect lifting/lightening thereof.

In another form of the invention, a planter row unit is provided having a time with a first unitary rigid plate for a soil engaging component, with the plate extending continuously over at least one half the distance between at least one of a) the top and bottom of the planter row unit and b) the front and rear of the planter row unit. A second unitary rigid plate can be provided to be assembled to the first unitary rigid plate as previously described. A third unitary rigid plate can be connected rigidly in assembled relationship to at least one of the first and second unitary rigid plates. The third unitary rigid plate has structure for attaching a soil engaging component, such as a closing wheel thereon.

The third unitary rigid plate, as the first and second unitary rigid plates, can be constructed in one piece, from flat metal stock.

The invention further contemplates a planter row unit having a first frame, at least one soil engaging component attached to the first frame in an operative position, first structure cooperating between a towing frame and the first frame for attaching the first frame to a) follow forward movement of the towing frame and b) be movable vertically relative to a towing frame, and structure acting between the planter row unit and a towing frame for selectively exerting an upward force on the first frame.

The structure acting between the planter row unit and a towing frame may be an extendable cylinder.

The structure acting between the planter row unit and a towing frame may act between the first cooperating structure and a towing frame.

The invention further contemplates a planter row unit having a frame, first structure on the frame for continuously defining a seed slot in underlying soil as the planter row unit is advanced in a forward towing direction, at least one closing wheel, and second structure for mounting the at least one closing wheel to the frame downstream of the first means for depositing soil in a slot defined by the first structure. The second structure may include a link, with structure for attaching the at least one closing wheel to the link, and structure for attaching the link to the frame so that the link pivots about a first axis. The at least one closing wheel moves vertically as the link pivots about the first axis.

The second structure further includes structure on the frame for exerting a bias on the link that urges the link in one pivoting direction around the first axis relative to the frame. The structure for exerting a bias resides at least partially above the first axis.

In one form, the structure for exerting a bias force resides entirely above the first axis.

The structure for exerting a bias force may be constructed to selectively exert a variable bias force on the link.

The link may have an L shape with first and second legs meeting at a mid portion and each having a free end. The first axis is adjacent the mid portion of the link. The at least one closing wheel is attached adjacent the free end of one of the first and second legs. The structure for exerting a bias force acts on the link adjacent the free end of the other of the first and second legs.

The structure for exerting a bias force may be a coil spring.

In one form, the structure for selectively exerting a variable bias force on the link includes an elongate rod and block, with there being means for mounting the block to the rod for movement selectively lengthwise relative to the rod as an incident of the rod and block being relatively rotated, with the coil spring acting between the block and a shoulder on the link.

A graspable handle can be provided on the rod to facilitate rotation thereof. This varies the spacing between the block and the link and thereby the bias force exerted on the link to urge the link in the one pivoting direction.

Cooperating structure can be provided on the handle and rod for allowing the handle to be positioned selectively in operative and locked positions. With the handle in the operative position, the rod is free to rotate. There is structure cooperating between the frame and handle for locking the handle against rotation with the handle in its locked position.

The rod may be connected by a pin to the frame, with the pin defining the link shoulder.

The invention further contemplates the combination of a) a towing frame including an elongate towing bar to be advanced in a forward towing direction, with the towing bar having a body with a rear surface and oppositely facing first and second surfaces and b) a row unit including a frame with structure for mounting the row unit in an operative position on the towing frame so that the row unit follows forward movement of the towing frame. The structure for mounting the row unit includes a plate having a body and a first rigid finger with a third surface thereon. The plate body abuts to the rear surface of the towing bar with the row unit in the operative position. The rigid finger overlies one of the oppositely facing first and second surfaces with the row unit in the operative position to thereby limit shifting of the plate body relative to the towing bar.

The row unit plate may have a second rigid finger with a fourth surface facing the third surface. The fourth surface overlies the other of the oppositely facing first and second surfaces.

The first and second surfaces may be the top and bottom surfaces on the elongate towing bar that extend transversely to the rear surface on the towing bar.

In one form, the towing bar extends in a lateral direction on the towing frame and there are second and third fingers spaced laterally from the first and second fingers with facing fifth and sixth surfaces which overlie the oppositely facing first and second surfaces.

Structure may be provided for drawing the plate against the rear surface of the towing bar. This may be in the form of a U-bolt, or other suitable structure.

In one form, the body has a flat surface and the first and second fingers are formed as one piece with the plate body. The first and second fingers may be bent to project at an angle to the flat surface on the plate body.

The invention further contemplates the combination of a) a towing frame to be advanced in a forward towing direction and b) a row unit including a frame and structure for mounting the row unit in an operative position on the towing frame so that the row unit follows forward movement of the towing frame. The structure for mounting the row unit includes a plate defining oppositely facing third and fourth surfaces, to captively embrace the first and second surfaces on the towing bar, and structure for drawing the plate against the towing bar.

The invention still further contemplates the combination of a) a towing frame and b) a row unit, with the latter including a frame, and structure for mounting the row unit in an operative position on the towing frame. The structure for mounting the row unit includes a plate with structure cooperating between the plate and towing bar for a) permitting the plate in a first orientation to be moved towards the towing bar in a first line into an operative position and b) preventing relative pivoting of the plate and towing bar around the first line with the plate in the operative position.

The invention further contemplates a planter row unit having a frame and a shaft for supporting the wheel for rotation about a first axis relative to the frame. The shaft has a frame mounting portion with a central axis and a first wheel mounting portion with a second central axis. The first and second axes are angularly oriented with respect to each other. The first shaft mounting portion and first wheel mounting portion are defined as one piece. First structure is provided cooperating between the frame and shaft mounting portion for aligning the shaft in an operative position on the frame.

The first cooperating structure may include a first shoulder on the shaft facing axially in a first direction and a second shoulder on the frame facing axially oppositely to the first direction. The first and second shoulders abut to place the shaft and frame in consistent alignment axially of the shaft with the shaft in the operative position.

In one form, the first cooperating structure includes a pin on one of the shaft and frame and a receptacle for the pin on the other of the shaft and frame, with the shaft in the operative position being consistently aligned against rotation about the first central axis relative to the frame with the pin in the receptacle.

Structure is provided for fixedly maintaining the shaft in the operative position on the frame. This structure may be a weld.

The shaft may include a second wheel mounting portion with a third central axis, with the first and third central axes being angularly oriented with respect to each other. The second wheel mounting portion is formed as one piece with the frame mounting portion and the first wheel mounting portion.

In one form, the first wheel mounting portion has a free end to which a wheel can be attached. The free end may have a reduced diameter to define an axially facing shoulder to abut to a wheel attached to the shaft.

The frame mounting portion of the shaft may have a diameter that is greater than the diameter of the first wheel mounting portion.

In one form, the frame includes a flat plate having an undercut defining the second shoulder.

The plate has oppositely facing flat surfaces, with the shaft projecting through the plate so that the first wheel mounting portion projects from one of the oppositely facing flat surfaces on the plate and the second wheel mounting portion projects from the other of the oppositely facing flat surfaces on the plate.

The invention further contemplates an agricultural planter unit having a towing frame, a wheeled carriage supporting the towing frame so as to allow the planter unit to be moved over underlying soil, a component to treat underlying soil, and structure for attaching the component to the towing frame in an operative position. The component is operated by a pressurized fluid supply to the component. The structure for delivering pressurized fluid is a hollow, rigid element defining a part of the towing frame.

The hollow rigid element may be a draw bar that connects to a towing vehicle for the planter unit. The hollow rigid element has a length and may have a squared cross section taken transversely to its length.

The hollow rigid element has an internal space, with there being an opening through the hollow rigid element and a fitting at the opening to allow a conduit to be connected to the fitting to establish fluid communication between the conduit and the internal space in the hollow rigid element.

In another form of the invention, an agricultural planter unit is provided having a towing frame, a wheeled carriage supporting the towing frame, a component to treat underlying soil attached to the towing frame and being operative by a pressurized fluid, structure for delivering pressurized fluid from a supply to the component and including a hollow rigid element defining a part of the frame and having an internal space, and at least one fluid containing conduit extending through the internal space on the hollow element. Accordingly, the internal space on the hollow element can be used to convey fluid from separate supplies to separate points of use.

The invention further contemplates the combination of a hitch subassembly, structure for mounting the hitch subassembly to a towing vehicle so that the hitch subassembly follows forward movement of the towing vehicle, structure on the hitch subassembly for connecting to a tongue and draw bar on a planter unit to be drawn by a towing vehicle in such a manner that a tongue on a drawing vehicle can be pivoted relative to the hitch subassembly in a predetermined range, structure for pressurizing a supply of fluid, structure cooperating between the hitch subassembly and fluid pressurizing structure for mounting the fluid pressurizing structure in an operative position on the hitch subassembly wherein the fluid pressurizing structure can be operated by a power source on a towing vehicle, and structure for communicating pressurized fluid from the fluid pressurizing structure to a point of use.

The combination may also include a towing vehicle having a power take off, with there being structure for operatively connecting the power take off on the towing vehicle to the fluid pressurizing structure with the fluid pressurizing structure in an operative position on the hitch subassembly.

The combination may further include a planter unit having a hollow draw bar defining an internal hollow space, with the structure for communicating pressurized fluid communicating pressurized fluid from the fluid pressurizing structure into the internal hollow space on the drawbar.

The structure for communicating pressurized fluid may be a flexible conduit.

The planter unit may have a hollow draw bar defining an internal hollow space, with there being a fitting on the draw bar, and the flexible conduit has an end that is attached to the draw bar fitting to establish communication between the fluid pressurizing structure and the internal hollow space in the draw bar.

The fitting may be located adjacent to the front of the planter unit.

In one form, the fluid pressurizing structure is a centrifugal air compressor having an air intake that is located at the front of the planter unit.

The fluid pressurizing structure has a fluid outlet, with there being a fitting on the fluid pressurizing structure defining a downwardly opening outlet end, and the structure for communicating pressurized fluid from the fluid pressurizing structure includes a conduit connected to the outlet on the fitting on the fluid pressurizing structure.

The fitting may have an inverted U-shaped configuration.

In one form, the outlet on the fitting is above the drawbar on the planter unit.

The invention further contemplates the combination of a towing vehicle for a planter unit and having a power take off, structure for pressurizing a supply of fluid, structure cooperating between the fluid pressurizing structure and towing vehicle for maintaining the fluid pressurizing structure rigidly in an operative position, structure for operatively connecting the power take off on the towing vehicle to the fluid pressurizing structure, a planter unit, structure for connecting the planter unit to the towing vehicle so that the planter unit follows forward towing movement of the towing vehicle and can pivot relative to the towing vehicle and the fluid pressurizing structure within a predetermined range, and structure for communicating pressurized fluid from the fluid pressurizing structure to a point of use on the planter unit.

The invention still further contemplates a planter unit having a towing frame to be advanced by a towing vehicle in a forward towing direction, a carriage supporting the towing frame at an operating height and having laterally spaced wheels to facilitate movement of the planter unit over underlying terrain, a receptacle on the towing frame for a supply of at least one of seed and a soil additive, structure for delivering at least one of seed and soil additive in the receptacle to underlying soil, and first structure cooperating between at least one of the wheels and delivering means for operating the delivering means in response to rotation of the at least one wheel and causing delivery of one of seed and additive at a rate that increases with the rotational velocity of the at least one wheel. The first cooperating structure includes metering structure for selectively varying the rate of delivery of one of seed and additive for a given rotational velocity of the at least one wheel.

The delivering structure may include structure on the row unit for continuously delivering seed into a seed slot, with the structure for delivering seed into the seed slot including a driven element. Structure is provided cooperating between at least one of the wheels and driven element for driving the driven element as an incident of the one wheel being rotated.

The invention further contemplates a planter unit having a frame, a wheeled carriage supporting the frame, a supply of at least one of seed and additive on the frame, first structure for controllably delivering the at least one of seed and additive from the supply to underlying soil over which the planter unit is moved, second structure on the frame for steering the frame, and third structure on the frame for propelling the frame over underlying terrain.

The first structure may include a plurality of row units each of which continuously defines a seed slot in underlying soil, introduces the at least one of seed and additive to the seed slot, and replaces soil over the seed slot as the planter unit is advanced.

A cab can be provided on the frame to allow an operator to reside therein while operating the planter unit.

In one form, a hitch structure is provided on the frame for removably attaching the planter unit to a towing vehicle. With this arrangement, the planter unit can be selectively self-propelled or drawn by the towing vehicle.

The hitch structure may be a three point hitch assembly as for attachment to a conventional tractor.

In one form, the planter unit has a front and rear, with the wheeled carriage being closer to the rear of the planter unit than it is to the front of the planter unit. There is a steerable wheel assembly on the frame that is closer to the front of the planter unit than it is to the rear of the planter unit.

Third structure may drive one or more wheels on the steerable wheel assembly and/or the wheeled carriage.

Structure may be provided on the frame for varying the rate of delivery of the at least one of seed and additive by the first structure. A seat may be provided on the frame for the operator, with the structure for varying the rate of delivery of at least one of seed and additive being accessible to the operator in the seat.

The third structure may include a drive engine.

An hydraulic pump and/or structure for generating a pressurized supply of air may be provided on the frame to be driven by the engine.

In another form of the invention, a planter unit is provided having a frame, a carriage supporting the frame including at least one ground engaging wheel that rotates about a first axis, a supply of one of seed and additive on the frame, and first structure for controllably discharging the one of seed and additive from the supply and including a rotary structure for determining the rate of discharge of the one of seed and additive based on the rotational velocity of the rotary structure, with the first structure including second structure for transmitting a rotative force from the ground engaging wheel to rotate the rotary structure. According to the invention, there is no drive chain on the second structure that resides below the first axis.

The first structure may include an elongate takeoff shaft that resides above the first axis with the length of the elongate takeoff shaft substantially parallel to the first axis. There is at least one metering structure for controlling delivery of the one of seed and additive to underlying soil, with there further being structure cooperating between the elongate takeoff shaft and one metering structure for causing the elongate takeoff shaft to operate the one metering structure.

The structure cooperating between the elongate takeoff shaft and one metering structure may be an endless drive element, such as an endless belt or chain.

In one form, the second structure includes a drive train between the ground engaging wheel and the elongate takeoff shaft. In one form, there is no drive chain on the drive train.

The drive train may include structure for placing the drive train selectively in engaged and disengaged states. With the drive train in the disengaged state, the elongate takeoff shaft is undriven by the one ground engaging wheel.

The drive train may include a one-way clutch and a torque limiting clutch.

The drive train may further include a first gear box and a U-joint between the one ground engaging wheel and the first gear box.

A first shaft may be driven through the first gear box, with there being a second gear box through which the first shaft drives the elongate takeoff shaft.

A second shaft may be driven by the first shaft through the second gear box.

The planter has a front and rear and laterally spaced sides. The first shaft may have an axis that extends in a fore and aft direction, with the elongate takeoff shaft and second shaft having axes extending laterally of the planter unit.

In another form of the invention, a planter unit is provided having a frame, a carriage supporting the frame including at least one ground engaging wheel that rotates about a first axis, a supply of one of seed and additive on the frame, and first structure for controllably discharging the one of seed and additive from the supply and including a rotary structure for determining the rate of discharge of the one of seed and additive based on the rotational velocity of the rotary structure. The first structure includes second structure for transmitting a rotative force from the ground engaging wheel to rotate the rotary structure. The first structure includes an elongate takeoff shaft, at least one metering structure for controlling delivery of the one of seed and additive to underlying soil, and structure cooperating between the elongate takeoff shaft and metering structure for causing the elongate takeoff shaft to operate the one metering structure. A drive train acts between the one ground engaging wheel and the elongate takeoff shaft, with there being no drive chain on the drive train.

BRIEF DESCRIPTION OF THE DRAWINGS

FIG. 7 is an enlarged, partial cross-sectional view of a shaft used to mount soil working wheels on the inventive row unit;

FIG. 8 is a plan view of a planting system including a planter unit, as in FIGS. 1 and 2, and a towing vehicle, with two additional six row planter units attached to increase the capacity thereof;

FIG. 9 is an enlarged, perspective view of an adapter used to connect the inventive planter unit to a towing vehicle;

DETAILED DESCRIPTION OF THE DRAWINGS

Figure 1:
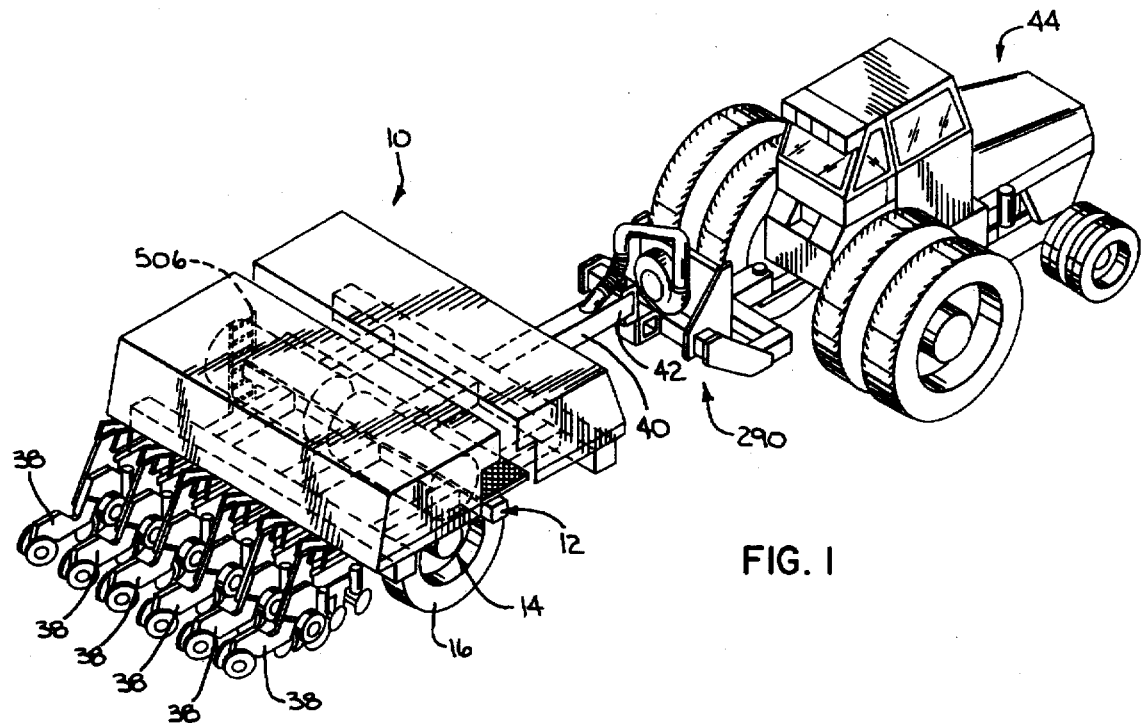
FIG. 1 is a perspective view of a six row planter unit, according to the present invention, connected to a towing vehicle.
Figure 2:
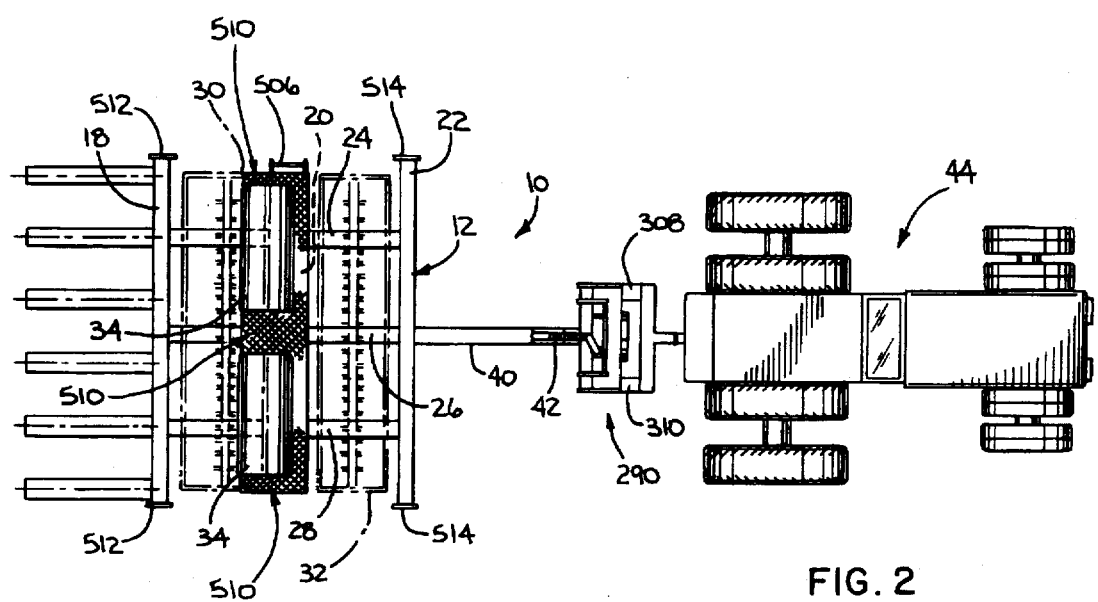
FIG. 2 is a plan view of the planter unit in FIG. 1 with protective covers, over seed and additive container, removed.
Figure 3:
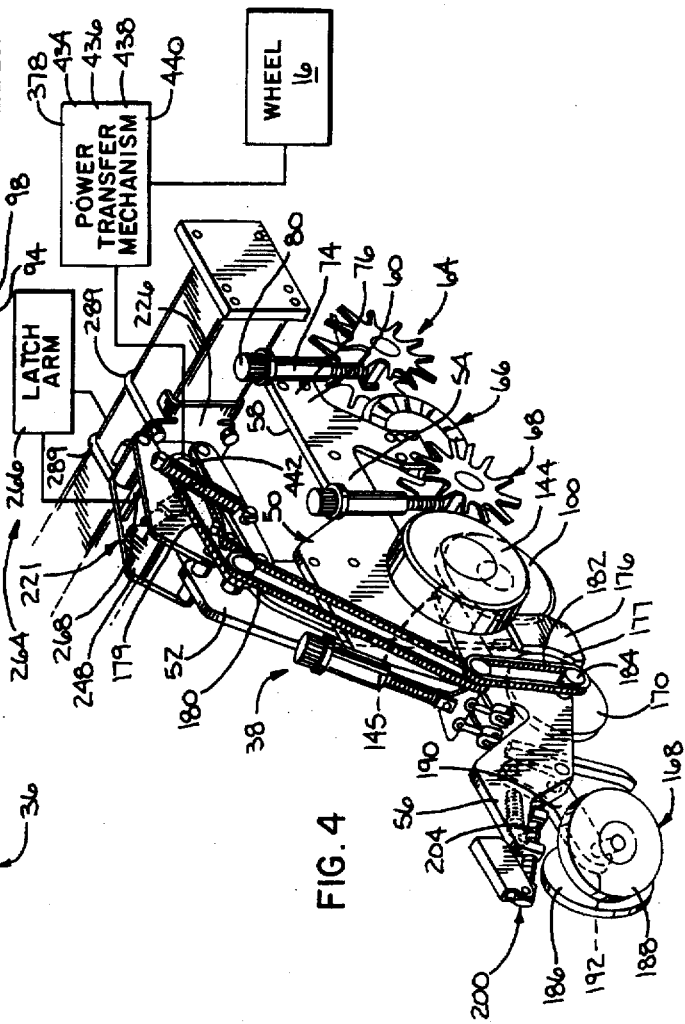
FIG. 3 is an enlarged side elevation view of the inventive planter.
Figure 16:
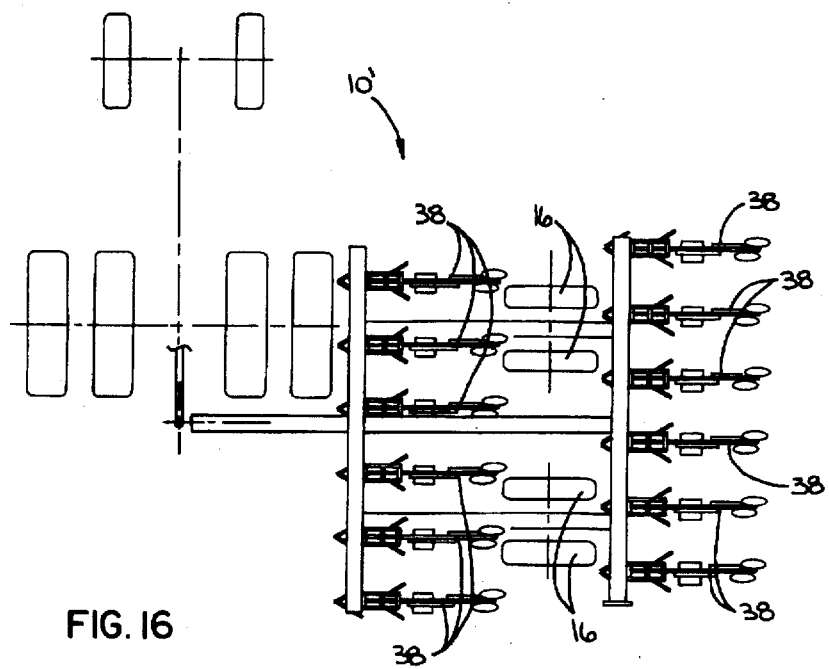
FIG. 16 is a schematic plan view of a twelve row planter unit, according to the invention, attached to a towing vehicle.

A preferred form of planter unit, according to the present invention, is shown at 10 in FIGS. 1–3. The planter unit 10 has a towing frame 12 which is supported in a fixed, elevated position, by a wheeled carriage 14. The carriage 14 has two, or more, laterally spaced wheels 16 which facilitate rolling movement of the planter unit 10 over underlying terrain. In a preferred form, two wheels 16 are provided on each side of the towing frame 12, as shown in FIG. 16.

The towing frame 12 has laterally extending, square beams/bars 18, 20, 22 joined with square beams/bars 24, 26, 28, extending in a fore and aft direction, and defining in conjunction with the beams/bars 18, 20, 22, a solid support for a bulk seed container 30, an additive container 32 and laterally spaced additive container tanks 34.

Dry or liquid primary fertilizer can be contained in bulk quantities in the additive container 32 for delivery to underlying soil at an upstream location, indicated at 36.

Starter fertilizer, herbicide, or like additive, is contained in bulk, liquid form in the tank containers 34. This additive is delivered, together with seed from the container 30, to underlying soil through row units 38 attached in a trailing position on the towing frame 12. Six of the row units 38 are shown and laterally spaced at regular intervals behind the towing frame 12, with the spacing determining the distance between seed rows.

In FIG. 16, a modified planter 101, according to the invention, is shown with twelve staggered row units 38.

Referring again to FIGS. 1–3, the towing frame 12 has a forwardly projecting draw bar 40 with a tongue 42 at its forward free end that removably attaches to a towing vehicle 44 to move therewith in a forward towing direction.

Briefly, as the planter unit 10 is advanced by the drawing vehicle 44, fertilizer coulter wheel assemblies at 45, corresponding in number and spacing to the seed rows, work the soil and deliver the desired amount of primary fertilizer to the soil. These wheel assemblies are translatable together in a vertical line for depth control. The mechanism for accomplishing this is shown in co-pending application Ser. No. 08/221,250, entitled "APPARATUS FOR CONTROLLING DOWN PRESSURE ON AGRICULTURAL IMPLEMENTS", now U.S. Pat. No. 5,497,837.

The trailing row units 38 resituate residue away from the planting line, part the cleared soil, deposit seed in the seed slot and fertilizer adjacent to the seed slot, and close the seed slot by distributing loosened soil thereover.

The inventive planter unit 10 represents a radical departure from conventional, commercially available planter units. One such modified structure is the row unit 38. The row units 38 on the inventive planter 10 are identical in construction. The description herein will thus be limited to one exemplary row unit 38, as shown in FIGS. 4–7, 12 and 13.

The row unit 38 has a frame 50 defined by a first unitary rigid plate 52, a second unitary rigid plate 54, and a third unitary rigid plate 56, which are bolted together in assembled relationship to cooperatively define the frame 50, which is the foundation of the row unit 38.

The plates 52, 54, 56, aside from facilitating mounting of various soil engaging components, as described below, add considerable weight to the row unit 38. Preferably, each of the plates 52, 54, 56 is constructed from flat metal stock having a thickness of 0.75 to 1.5 inches. In a preferred form, the plates 52, 54, 56 are fabricated from one inch stock. The overall weight of the row units 38, as depicted, is on the order of 700 pounds, principally by reason of the weight of the plates 52, 54, 56. This is roughly twice the weight of some conventional row units.

The first plate 52 has a generally rectangular configuration with the longer dimension thereof aligned vertically on the row unit 38. As seen most clearly in FIG. 5, the vertical dimension of the first plate 52 extends preferably over one half the distance D between the top and bottom of the row unit 38, and in this particular embodiment, extends vertically over approximately 80% of the distance D.

The second plate 54 is elongate, with the length thereof extending in a fore and aft direction on the row unit 38. The second plate 54 has a dimension in the fore and aft direction that is at least equal to one half the distance D1 between the front and rear of the row unit 38. In this particular embodiment, the second plate 54 extends in a fore and aft direction through a distance of approximately 60% of the distance D1.

The third plate 56 is rigidly attached at the trailing end of the second plate 54 so that the combined length of the second and third plates 54, 56 is on the order of 90% of the distance D1.

The assembled first and second plates 54, 56 have their longer dimensions transverse to each other to cooperatively define a T shape, with the first plate 52 defining a vertically extending cross bar and the second plate defining a stem extending in a fore and aft direction.

The second plate 54 has oppositely facing, flat surfaces 58, 60, which facilitate attachment and removal of, in this case, three soil engaging components 64, 66, 68.

The first soil engaging component 64 consists of a meshing pair of rotary, toothed wheels 70, 72. Suitable wheels are currently sold by the assignee herein under the registered trademark TRASHWHEEL®. These wheels 70, 72 are supported in an operative position on a stem 74, which is removably held in an operative position at the front 76 of the second plate 54 by bolts 78.

Structural details of the wheels 70, 72 and the mounting stem 74 are described in detail in my U.S. Pat. No. 5,129, 282, which is incorporated herein by reference. It suffices to say that with the stem 74 attached to the plate 54, the angular arrangement of the wheels 70, 72 causes the wheels to rotate as they are dragged through underlying soil. This rotation produces a scissors-like action on soil and residue and distributes the residue to the sides of the seed line. The vertical depth of the wheels 70, 72 can be altered by rotating a graspable cap 80 at the top of the stem 74. This cap is the subject of my U.S. Pat. No. 5,240,080.

The bolts 78 are extendable selectively through a first pair of bores 82 and a rearwardly offset second pair of bores 84, to maintain the soil engaging component 64 in either of two different positions relative to the plate 54.

The soil engaging component 68 has the same construction as the soil engaging component 64 and is mounted to the plate 54 downstream of the soil engaging component 64 in a like fashion.

The soil engaging component 66 is a coulter wheel that is bolted to a depending leg 86 on the plate 54 in one of two positions, depending upon whether the bolts are extended through a first set of bores 88 or a second set of bores 90, spaced rearwardly therefrom.

The cooperative arrangement of the coulter wheel 66 and component 68 is the subject of my co-pending U.S. application Ser. No. 08/078,573, entitled "APPARATUS FOR PREPARING SOIL FOR THE PLACEMENT OF SEED AND ADDITIVE", now U.S. Pat. No. 5,333,732.

It can be seen that the components 64, 66, 68 can be conveniently accessed from each side of the plate 54 to facilitate attachment and removal, as to effect relocation or repair thereof.

Separate soil engaging components 92, 94 are attached in an operative position on the first plate 52. The component 92 consists of a pair of disks 98, 100, which are angularly arranged so as to diverge both rearwardly and upwardly. This arrangement causes the disks 98, 100 to part the underlying soil to define a seed slot. This disk pair 98, 100 is commonly referred to in the industry as a "V-opener".

According to the invention, a single piece shaft 104, as shown in FIG. 7, is used to attach the disks 98, 100 consistently in an operative position on the plate 52. More particularly, the shaft 104 has a central frame mounting portion 106 with a central axis 108. A first wheel mounting portion 110, with a central axis 112, projects in cantilever fashion away from the frame mounting portion 106. The axes 108, 112 make an angle α with respect to each other of approximately 4½°. A second wheel mounting portion 114, with a central axis 116, projects axially oppositely to the wheel mounting portion 110 such that the central axis 116 thereof makes the same angle α with the central axis 108 of the frame mounting portion 106.

The frame mounting portion 106 has a larger diameter than the wheel mounting portions 110, 114. The frame mounting portion 106 has a radially enlarged portion 118 defining an axially facing shoulder 120, which is abuttable to a facing surface 122 defined by an undercut on the frame plate 52.

To assemble the shaft 104, the first wheel mounting portion 110 is directed from left to right in FIG. 7 through a bore 124 in the plate 52. The shoulders 120, 122 will abut with the shaft 104 and frame plate 52 in consistent alignment axially of the shaft 104, with the shaft 104 in the operative position of FIG. 7.

To prevent relative rotation between the shaft 104 and plate 52 about the axis of the shaft 104, with the shaft 104 in the operative position of FIG. 7, a pin 126 is provided on the frame mounting portion 106 and projects radially therefrom into a receptacle 130 on the frame plate 52.

This arrangement makes it virtually impossible to improperly assemble the shaft 104. Once the shaft 104 is placed in the operative position of FIG. 7, it can be fixedly maintained on the plate 52, as by a weld 132.

With the shaft 104 fixedly maintained in its operative position, the cantilevered wheel mounting portions 110, 114 are conveniently accessible from the opposite, flat side surfaces 134, 136 of the plate 52. The wheel mounting portion 110 has a reduced diameter portion 138 that defines an axially facing shoulder 140 to abut to the disk 100. The reduced diameter portion 138 is threaded to accept a nut 142, which locks the disks 100 onto the wheel mounting portion 110. The disk 98 is attached in like fashion to the wheel mounting portion 114 on the opposite end of the shaft 106.

The component 94 consists of a pair of gauge wheels 143, 144, as seen in FIGS. 3–6 and 13, which maintain the frame 50 at a desired height relative to the underlying terrain. Each gauge wheel 143, 144 is mounted in similar fashion to the plate 52. Thus description herein will be limited to the exemplary gauge wheel 144.

The gauge wheel 144 is bolted to one end 145 of an elongate link, 146. A pin 148 at the mid portion of the link 146 permits the link 146 to rotate about a laterally extending axis. The opposite link end 150 is attached to a plate 152 that is selectively raised and lowered by an adjusting mechanism 154 through a rotatable, graspable cap 156. The plate 152 is moved downwardly to pivot the link end 145 and the associated gauge wheel 144 upwardly to thereby lower the frame 50. Elevation of the plate 152 produces the opposite result.

The plate 152 is pivotably mounted to the adjusting mechanism 154 through a pin 158 that allows the plate 152 to swivel about a fore and aft axis. A connector 160 on the plate 152 is pivotably connected to the link end 150. With a similar arrangement on both links 148, 162, the links 148, 162, and associated gauge wheels 143, 144, are permitted to move up and down independently of each other.

The second plate 54 has a concave edge 164 which matches the curvature of the gauge wheel 144 so as not to interfere therewith.

The third plate 56 mounts soil engaging components 166, 168. The soil engaging component 166 is a press wheel 170 that presses seed introduced to a seed slot firmly into the soil at the bottom of the seed slot. This structure is shown in detail in my co-pending U.S. application Ser. No. 08/189, 840, entitled "MECHANISM FOR PLANTING AGRICULTURAL SEED", now abandoned.

It suffices to say that seed from the container 30 is delivered through a metering mechanism 172 (FIG. 6) into a conduit 174 for delivery from the free end 176 thereof into a seed slot. With the plates 52, 54 in assembled relationship, a space is defined therebetween to allow the conduit 174 to be threaded downwardly to the bottom free end 176 of the plate 52. The free end 176 has an edge 177 that conforms to the curvature of the press wheel 170. This free plate end 176 shields the seed introduction area and the conduit free end 176.

Seed is discharged at regular intervals as the row unit 38 is advanced. The seed is propelled by the metering mechanism 172 into the base of the seed slot immediately in front of the advancing press wheel 170. The press wheel then firmly plants the seed.

The press wheel 170 is driven off the carriage wheel 16 through an intermediate mechanism 178, which serially rotates endless chains 179, 180, 182, with the chain 182 effecting rotation of a laterally extending shaft 184 on the press wheel 170.

The soil engaging component 168, as seen clearly in FIGS. 3–6 and 12, consists of a pair of closing wheels 186, 188, which are mounted to an L-shaped link 190 in an orientation wherein they diverge forwardly and upwardly in conventional fashion.

The link 190 has a first leg 192, at the free end of which the closing wheels 186, 188 are operatively connected. The link 190 is pivotably connected to the plate 56 at its mid portion 194 by a pin 196. The other link leg 198 projects upwardly from the pivot pin 196.

Figure 12:
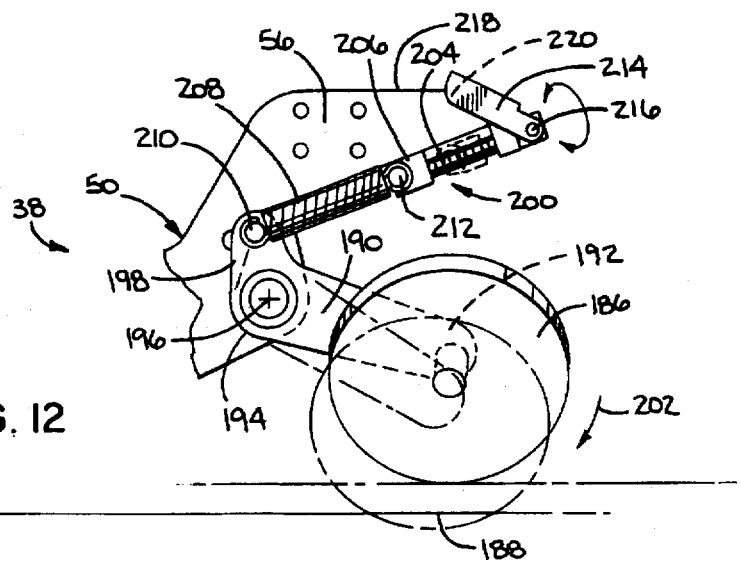
FIG. 12 is an enlarged, fragmentary, side elevation view of a closing wheel on the inventive row unit.
Figure 13:
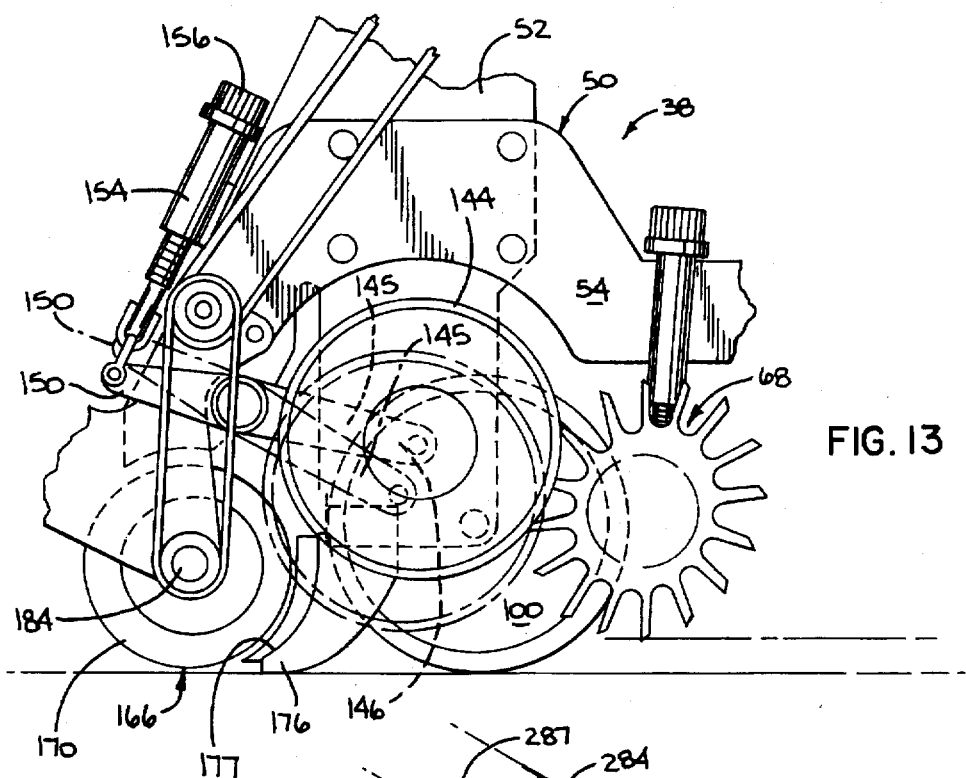
FIG. 13 is an enlarged, fragmentary, side elevation view of a portion of the inventive row unit, including movable gauge wheels thereon.
Figure 14:
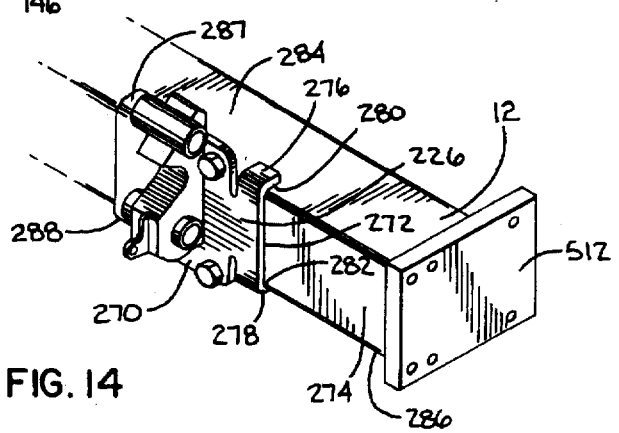
FIG. 14 is an enlarged, perspective view of a mounting plate for connecting the inventive row unit to a towing frame.

Means are provided at 200 for exerting a bias force on the link leg 198 to urge the wheels 186, 188 in a clockwise pivoting direction in FIG. 12, in the direction of arrow 202 around the pivot pin 196.

The biasing means 200 consists of an elongate, rod 204 threadably attached to a block 206 so that the block 206 is movable lengthwise relative to the rod 204 by effecting relative rotation between the rod 204 and block 206.

A tension coil spring 208 is connected to a pin 210 on the link leg 198 and a pin 212 on the block 206. Movement of the block 206 from left to right in FIG. 12 produces a greater tensile force on the link leg 198 which thereby increases the downward force exerted by the wheels 186, 188 on underlying terrain.

The bias exerted on the link is conveniently variable by providing a pivoting handle 214. Pivoting of the handle 214 in FIG. 12 in a clockwise direction about a pin 216 permits the handle 214 and rod 204 to rotate. This represents the operative position for the handle.

In the locked handle position of FIG. 12, the top edge 218 of the plate 56 resides in a receptacle 220 on the handle 214. This cooperative arrangement acts as a means to lock the handle 214, and thus the rod 204, against rotation.

Means is provided at 222, as seen in FIGS. 3–6, to cooperate between the towing frame 12 and the row unit 38 for attaching the row unit 38 so that the row unit 38 both follows forward movement of the towing frame and is movable vertically relative to the towing frame 12. This allows the row unit 38 to move conformingly over underlying terrain.

The means 221 is a four bar linkage that defines a parallelogram. More particularly, laterally spaced upper links 222, 224 have their opposite ends pivotably connected to the frame plate 52 and a mounting plate 226 fixed to the frame 12. The laterally spaced lower links 228, 230 have opposite ends likewise connected to the frame plate 52 and the mounting plate 226 on the frame 12.

The pivot axes 232, 234 for the upper links 222, 224 are parallel to each other and to the pivot axes 236, 238 for the links 228, 230. The spacing between the axes 232, 234 is the same as the spacing between the axes 236, 238. Similarly, the spacing between the axes 232, 236 is the same as the spacing between the axes 234, 238.

Tension coil springs 240 (one shown) are connected between the links 224, 230 and 222, 228.

Means is provided at 244 to produce a lifting force on the row unit 38. This lifting force is necessary when soft soil is encountered and the heavy row unit 38 tends to sink therein. In this case, an hydraulic cylinder 246 acts between the frame mounting plate 226 and a rod 248 spanning the upper links 222, 224. The cylinder 246 has a stroke that will produce a lift range of 18 inches for the row unit 38. This obviates the need to have to raise and lower the towing frame 12 relative to the underlying carriage 14, as is conventionally done.

While the cylinder 246 could be manually controlled at each individual row unit, the inventor herein has devised a system for, with this row unit construction, simultaneously lifting the row units 38, either manually from a remote location, or automatically in response to a sensing of varying soil hardness. This system is described in detail in my co-pending application Ser. No. 08/097,978, entitled "AGRICULTURAL IMPLEMENT CONTROLLER TO COMPENSATE FOR SOIL HARDNESS VARIATION", now U.S. Pat. No. 5,479,992.

Figure 15:
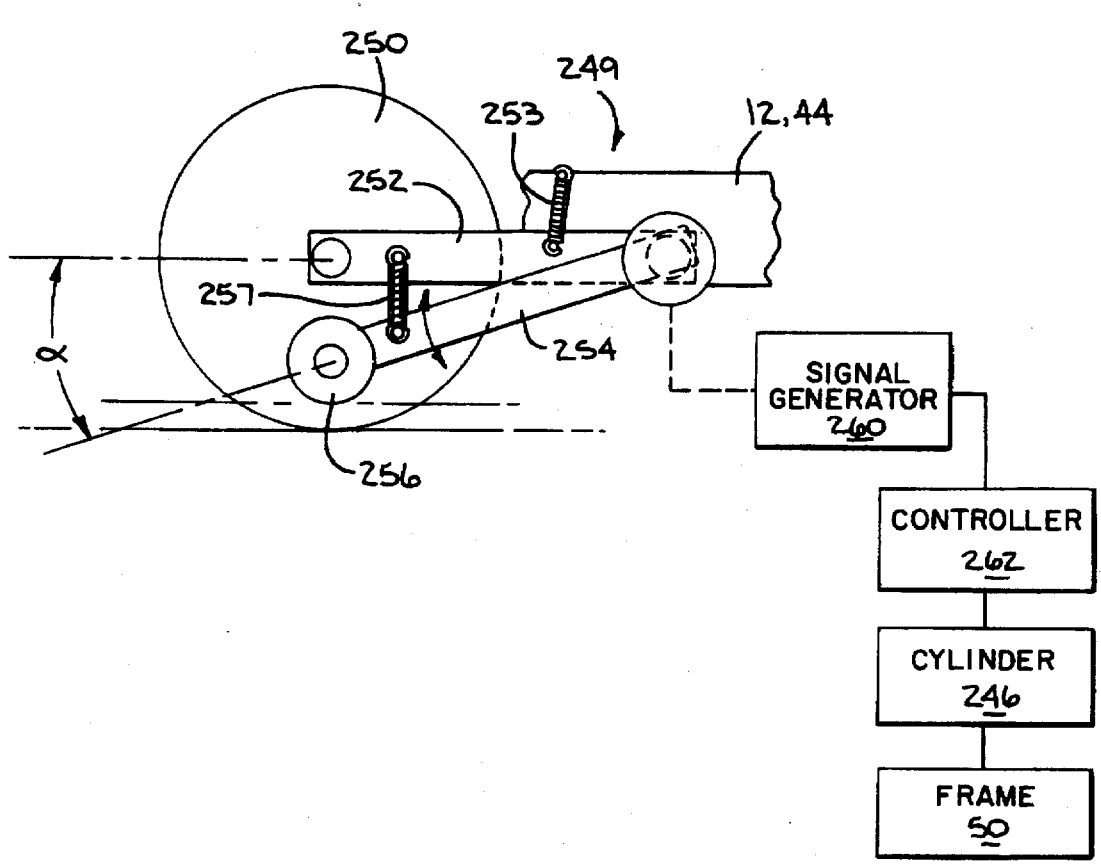
FIG. 15 is a schematic, side elevation view of a system for sensing the hardness of soil and generating a signal indicative thereof.

Briefly, a system as shown at 249 in FIG. 15 can be utilized to produce a signal indicative of soil hardness. A gauge wheel 250 is constructed with a sufficient soil engaging area that it will remain at substantially a constant height, even in different soil conditions. The gauge wheel 250 is carried on an arm 252 projecting off either the frame 12 or the towing vehicle 44 (see also FIG. 8), and pivotably connected thereto. A coil spring 253 connects between the frame 12 and arm 252. A second arm 254 is pivotably connected to the first arm 252 and has at its free end a sensing wheel 256. A coil spring 257 connects between the arms 252, 254. The sensing wheel 256 has a sufficiently small soil engaging area that it will sink readily in soft soil.

A signal generator 260 will produce a signal indicative of the angle $\alpha$ between the lengths of the arms 252, 254. In soft soils, this angle $\alpha$ will increase. The signal developed by the generator 260 is received by a controller 262, which operates a cylinder 246 to either increase or decrease the upward force on the frame 50.

The cylinder 245 connects either between a) the links 222, 224, 228, 230, b) the links 222, 224, 228, 230 and frame plate 52, c) the links 222, 224, 228, 230 and the towing frame 12 or d) the frame plate 52 and towing frame 12.

Figure 4:
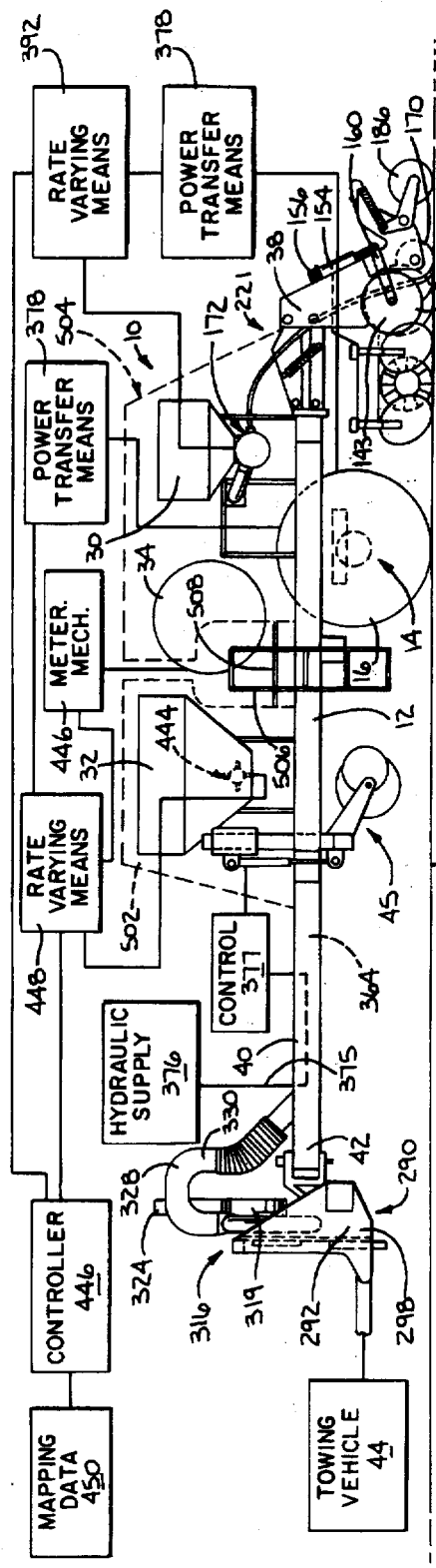
FIG. 4 is an enlarged, perspective view of a single row unit on the inventive planter unit.
Figure 5:
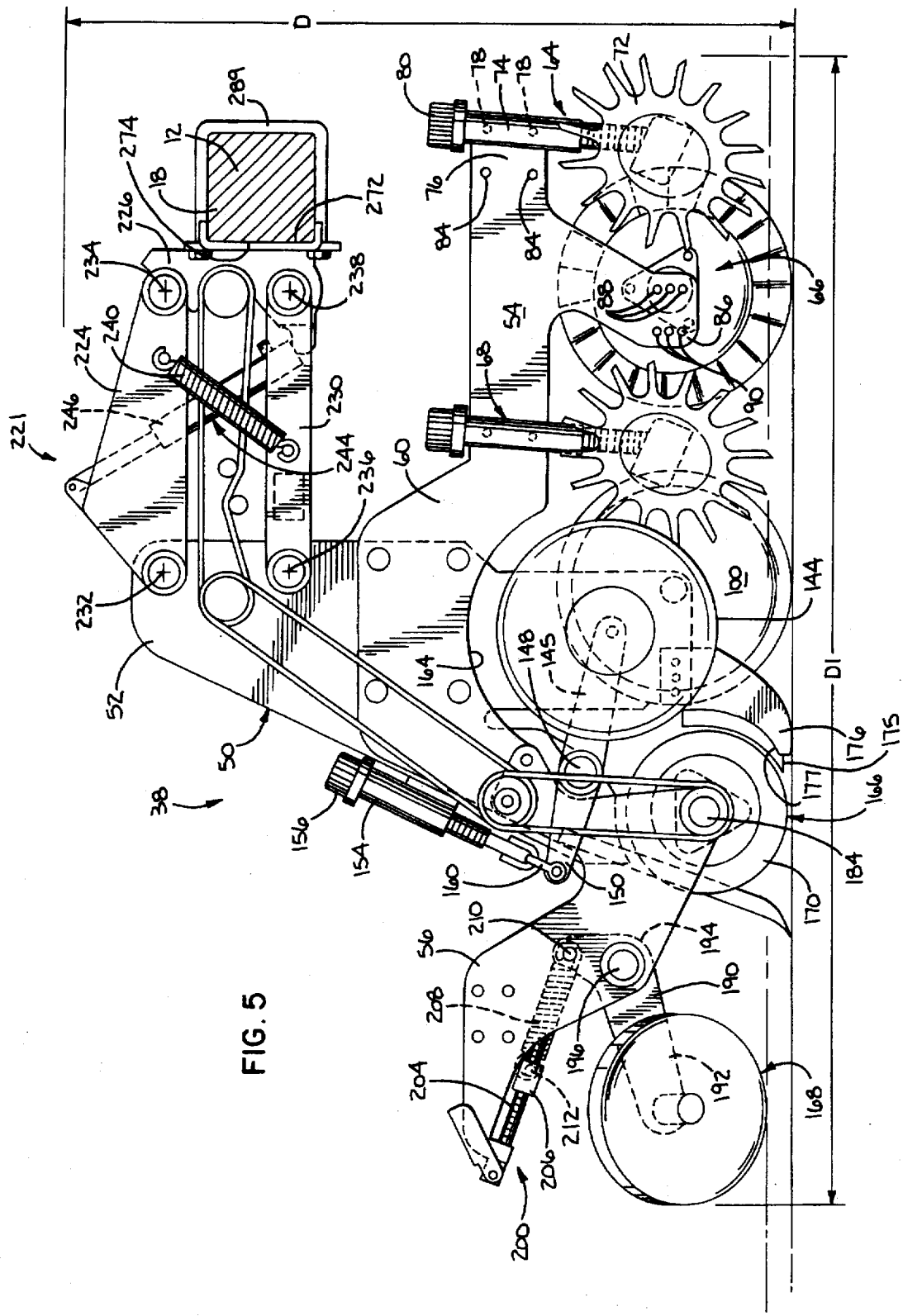
FIG. 5 is an enlarged, side elevation view of the row unit in FIG. 4.
Figure 6:
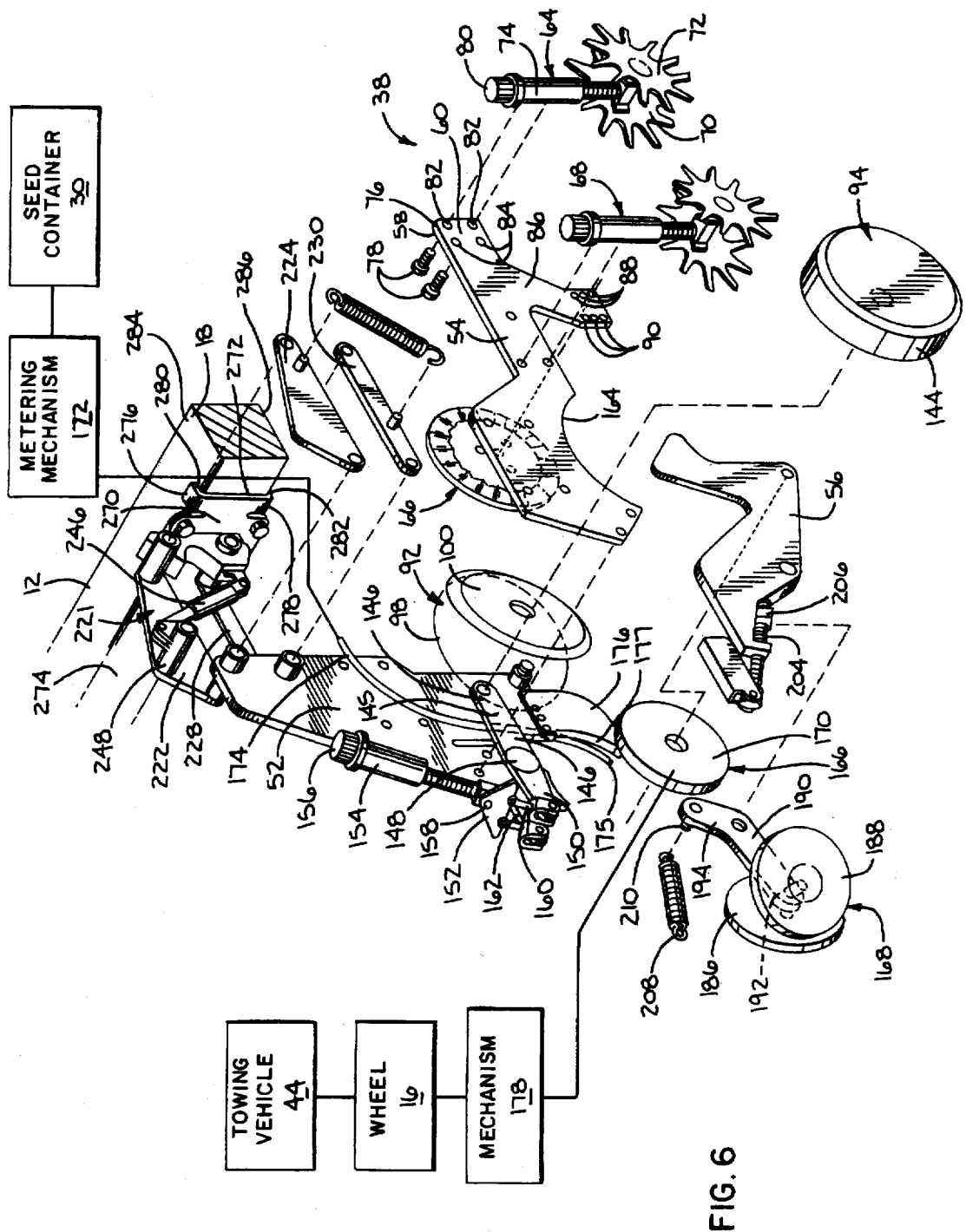
FIG. 6 is an enlarged, exploded, perspective view of the inventive row unit in FIGS. 4 and 5.
Figure 10:
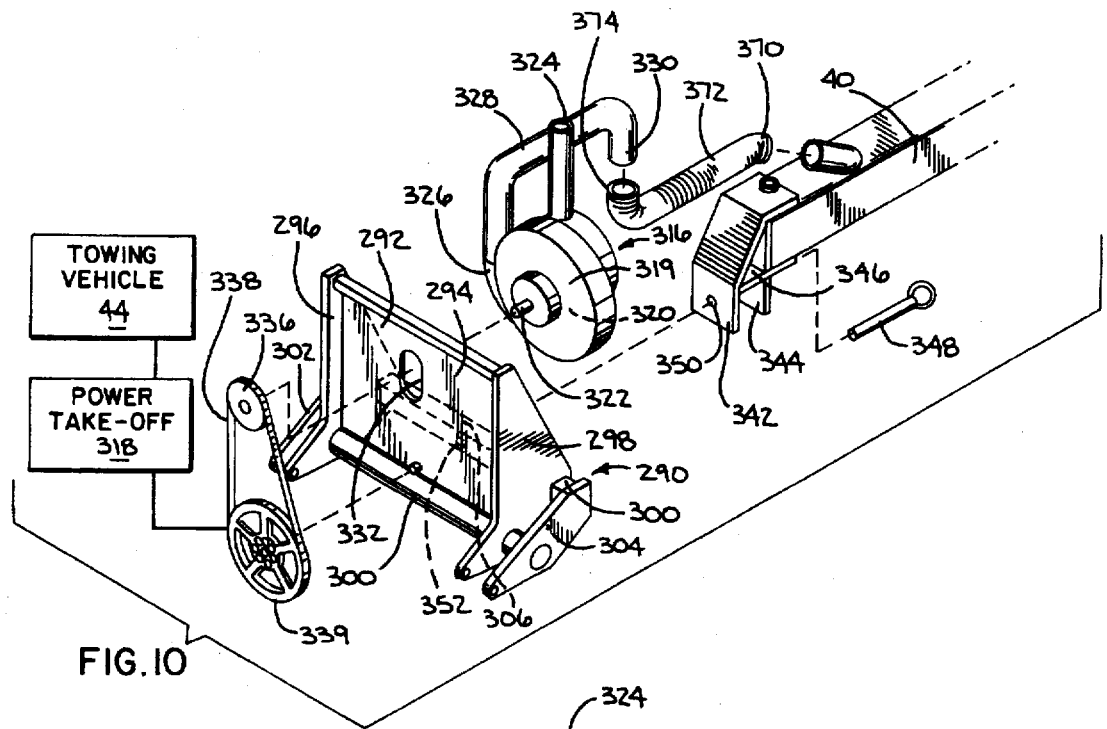
FIG. 10 is an enlarged, exploded, perspective view of the connection between the planter unit and a hitch subassembly including a system for pressurizing and delivering a fluid to the planter unit.
Figure 11:
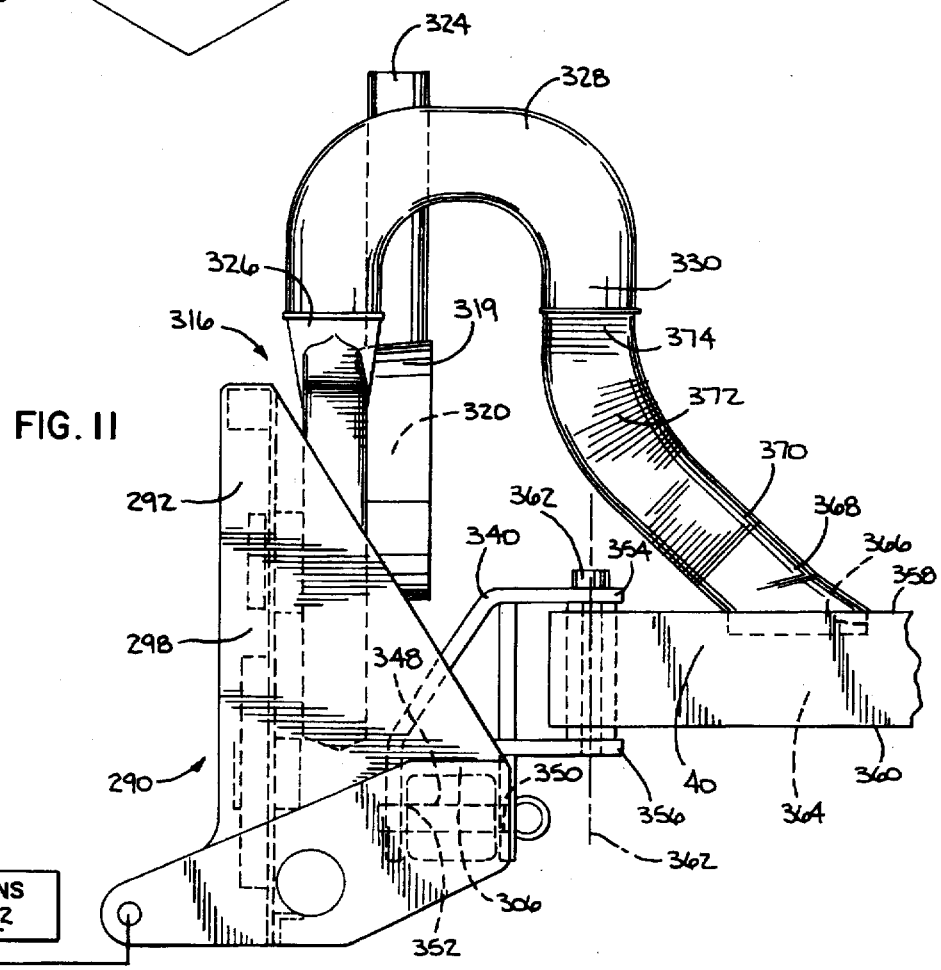
FIG. 11 is an enlarged, side elevation view of the draw bar on the planter attached to the hitch subassembly and with the fluid pressurizing system in an operative position to be connected to a power take off on a towing vehicle.

A latch means, as shown in FIG. 4, is optionally provided at 264 to maintain the row unit 38 in a raised position. The latch means 264 includes a latch arm 266 on one of the frame 12 and row unit 38 and a latch pin 268 on the other of the frame 12 and row unit 38. In this case, the latch arm 266 is provided on the frame 12, with the latch pin 268 provided on the row unit 38. This arrangement could be reversed. The latch means 264 takes pressure off the cylinders 246, as when transporting the planter unit 10 with the row unit 38 elevated.

Another aspect of the invention, as seen in FIGS. 4–6 and 14, is the formation of the mounting plate 226 to cooperate with the frame 12 so that the mounting plate 226 does not skew relative to the frame, particularly about a fore and aft axis.

The plate 226 has a body 270 with a flat surface 272 designed to facially abut a rearwardly facing flat surface 274 on the towing frame beam/bar 18 which acts as a towing bar.

A first pair of upper and lower rigid fingers 276, 278 are bent away from the body 270 to define facing surfaces 280, 282 which facially overlie the upwardly facing surface 284 and downwardly facing surface 286 on the towing bar 18. A similar pair of rigid fingers 287, 288 are provided on the plate 226 in laterally spaced relationship to the fingers 276, 278.

With this arrangement, forward movement of the mounting plate 226 in a first orientation relative to the towing bar 18 causes the fingers 276, 278 to captively embrace the towing bar 18.

U-bolts 289 surround the towing bar 18 and draw the mounting plate 226 captively against the towing bar 18 to positively maintain the plate 226 in an operative position on the towing bar.

Another aspect of the invention is the provision of a hitch subassembly as shown at 290 as shown in FIGS. 1–3 and 8–11.

The hitch subassembly 290 has a frame 292 including a flat, upright wall 294 and spaced, transverse side walls 296, 298. A front reinforcing bar 300 laterally spans the frame 292 and extends through the side walls 296, 298 and laterally outwardly therefrom to mounting plates 302, 304 spaced outside of the walls 296, 298, respectively.

A rear reinforcing bar 306 extends laterally through the side walls 296, 298 and is fixed to the opposite side plates 302, 304.

Laterally spaced hitch parts 308, 310 project rearwardly from the towing vehicle 44 to between the side wall 296 and plate 302 and side wall 298 and plate 304. Once in this operative position, the connection between the hitch parts 308, 310 and frame 292 is maintained by removable pins 312.

A means at 316 for producing a pressurized fluid supply is mounted in an operative position on the frame 294, and in that position can be operatively connected to a power take off 318 on a towing vehicle 44.

The means 316 has a cylindrical housing 319 that defines an internal compression chamber. A fan blade 320 rotates in the housing chamber on a shaft 322 to centrifugally compress fluid drawn in from an inlet 324. The housing 319 has an outlet 326 to which an inverted, U-shaped fitting 328 is attached. The fitting 328 has a downwardly projecting outlet 330 which exhausts the compressed fluid at a point above the draw bar 40.

With the means 316 operatively connected to the frame 294, the shaft 322 projects forwardly through an opening 332 in the frame wall 294.

A pulley 336 is connected to the free end of the shaft 322 projecting forwardly through the frame 292. A belt 338 is trained around the pulley 336 and a separate pulley 340 driven by the power take off 318 on the towing vehicle 44.

With this arrangement, the means 316 draws clean air from immediately behind the towing vehicle 44. Some conventional corresponding fluid compressors are mounted on planter units a significant distance downstream so as to be subjected to the dust and debris churned up by the soil engaging components on the planter unit.

Another significant feature of the invention is that the means 316 remains stationary with the towing vehicle 44. Consequently, the draw bar 40 can be pivoted relative to the planter unit 10 to make an angle of as much as 90° with the length of the towing vehicle 44, as shown in FIG. 8. This is made possible by the fact that no shaft connection is required to be made between the towing vehicle and the planter unit 10 to operate the means 316.

To make the connection between the subassembly 290 and the draw bar 40, an adapter 340 is utilized. The adapter 340 has spaced, depending flanges 342, 344 which captively surround the rear reinforcing bar 306. An upper plate 346 abuts to the reinforcing bar 306 in a position in which a holding pin 348 can be directed through aligned bores 350, 352 in the flanges 342, 344 and reinforcing bar 306, respectively, to thereby prevent upward movement of the adapter 340.

The adapter 340 has vertically spaced flanges 354, 356 which are arranged to surround the top surface 358 and the bottom surface 360 of the draw bar 40. A releasable locking pin 362 can be directed through the flange 354, the drawbar 40, and the flange 356 to define a connection for relative pivoting movement between the draw bar 40 and adapter 340 about a vertical axis 362.

According to the invention, pressurized fluid is delivered by the means 316 through an internal space 364 defined by the rigid, hollow, draw bar 40. An opening 366 is provided in the top surface 358 of the draw bar 40 to establish communication with the internal space 364. A fitting 368 is mounted to the draw bar 40 around the opening 366 and releasably accepts the end 370 of a flexible conduit 372. The other conduit end 374 is connected to the outlet end 330 of the fitting 328 to establish communication of pressurized fluid/air between the means 316 and the space 364.

The rigid draw bar 40 defines a communication path for the pressurized air from the means 316 to the metering mechanism 172 on the seed container 30. Another conduit 375 can be directed through the hollow space 364 within the draw bar 40 so that the draw bar 40 can communicate two different fluids to two different points of use. In this case, the conduit 374 is shown communicating between an hydraulic supply 376 and a control 377 for the fertilizer coulter wheel assembly 45 to selectively effect vertical movement thereof.

According to the invention, the wheel 16 is used to mechanically operate the metering means 172, thereby obviating the need for separate hydraulic or electric supplies. In this case, rotation of one of the wheels 16 causes operation of the metering means 172 through a power transfer means 378.

Normally, for a given rotational velocity for the wheel 16, the metering means 172 is operated to deliver seed at a first rate. It may be desirable to vary the rate of seed delivery for a given rotational velocity. This is accomplished by a rate varying means as described below.

Similarly, as also described below the wheel 16, through a power transfer means, operates a control to release fertilizer from the containers 32, 34 at a rate normally proportional to the rotational velocity of the wheel 16.

A rate varying means can be incorporated to change the rate of delivery of the additive from the containers 32, 34 for a given rotational velocity for the wheel.

Both rate varying means may be operable in response to a signal from a separate controller that is input with previously generated mapping data, as further described below.

Figure 17:
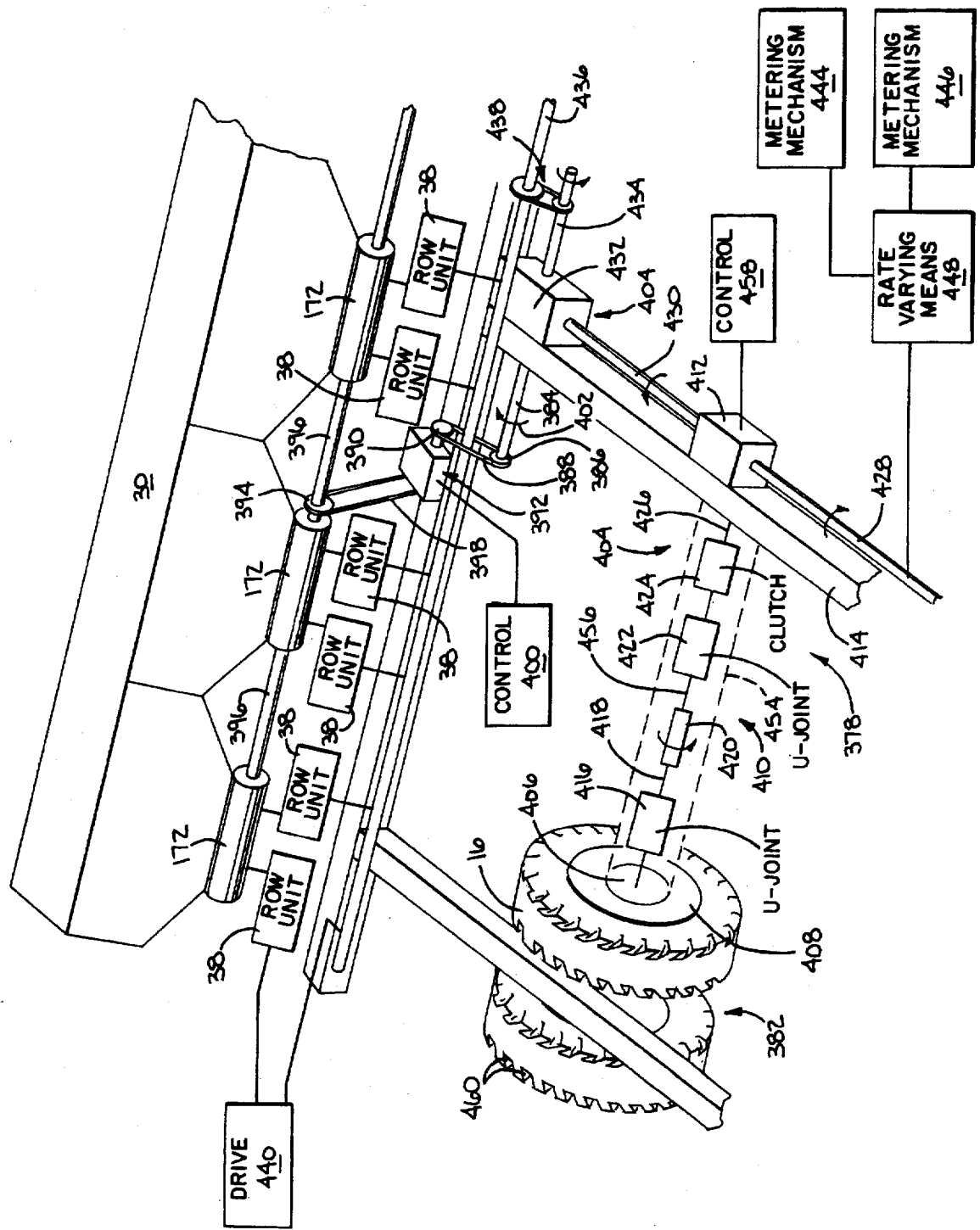
FIG. 17 is an enlarged, fragmentary, perspective view of a metering system on the inventive planter unit for controllably delivering seed and/or additive from supplies on the frame to underlying soil.

Details of the power transfer means 378 are shown in FIG. 17. The power transfer means 378 transmits a rotative force from one of the ground engaging wheels 16 on one wheel carriage assembly 382 to a laterally extending takeoff shaft 384. The takeoff shaft 384 has a sprocket 386 mounted thereon. An endless power transmission element, that is preferably a chain 388, is trained around the sprocket 386 and a sprocket 390 on a speed shifting 1 rate varying mechanism 392.

A sprocket (not shown) on the speed shifting mechanism 392 drives a sprocket 394 and a laterally extending shaft 396 through an endless chain 398. The shaft 396 in mm drives each of the metering mechanisms 172 on the seed container 30. Seed is communicated from each metering mechanism 172 to a pair of row units 38 for delivery thereby into a seed slot in the underlying soil.

The speed shifting mechanism 392 has a conventional construction. A manual control 400 can be used to operate the speed shifting mechanism 392 to vary the ratio of the output speed of the shaft 396 for a given input from the takeoff shaft, rotated in the direction of the arrow 402, which input speed is proportional to the rotational velocity of the wheel 16.

A power transmission train, between the wheel 380 and the shaft 384 is shown at 404. The power transmission train is driven off a plate 406 that is bolted to the hub 408 on the wheel 380.

The power transmission train 404 includes a force transmission assembly at 410 connecting between the plate 406 and a first, right angle gear box 412 mounted to a central frame element 414 extending in a fore and aft direction. The force transmission assembly 410 includes consecutively, from the plate 406, a first U-joint 416, telescoping shaft sections 418, 420, a second U-joint 422, and a one-way and torque limiting clutch 424. A shaft 426 extends laterally into the gear box 412.

The shaft 426 drives a forwardly extending shaft 428 and a rearwardly extending shaft 430 through the gear box 412. The shaft 430 drives the takeoff shaft 384 through a second, right angle gear box 432.

The shaft 430 also drives a shaft 434 which in turn drives a laterally extending takeoff shaft 436 through a chain and sprocket assembly at 438. The previously described press wheels 170, associated with each row unit 38, are driven by the shaft 436 through a drive shown schematically at 440, for an exemplary row unit 38 on the left side of FIG. 17. The drive 440 may be of any suitable construction and, in a preferred form, is a chain and sprocket arrangement that drives a shaft 442 (FIGS. 4 and 5) on each row unit to thereby drive the press wheel 170 through the serially arranged chains 179, 180, 182.

The forwardly extending shaft 428 on the power transfer mechanism 378 can be used to drive a metering mechanism 444, as seen in FIG. 3, associated with the additive container 32 and/or a metering mechanism 446 associated with the container tanks 34. The power transfer means 378 can operate the metering mechanisms 444, 446 through a speed shifting mechanism/rate varying means 448, corresponding to the means 392, previously described.

Both rate varying means 392, 448 can be operated through a central controller 446, which may be manually operable or responsive to mapping data input 450.

With this arrangement, there need not be any drive chains in the transmission train 404 between the plate 406 and shafts 384, 434. Consequently, the performance of the power transmission train between these two points is generally unaffected by existing residue in a field. To further shield the force transmission assembly 410, a protective, cylindrical sleeve 454 is placed thereover between the plate 406 and the frame element 414.

In a preferred form of the invention, the carriage wheels 16 have a running radius of approximately 15 inches compared to approximately 10 inches in the prior art. This is high enough that even if a chain were used as in the conventional system, residue would be less likely to migrate between any chain and a cooperating sprocket. However, with the inventive system, there is no chain or sprocket necessary at or below the axis 456 about which the wheels 16 rotate on the carriage 382.

The invention also contemplates that a control 458 be provided to selectively disengage the shafts 428, 430, either manually at the gear box 412 or at a location remote therefrom.

The wheels 16 are each preferably a tractor-type wheel with a thick tread 460 that is not prone to slipping in underlying soil. Accordingly, precise delivery of seed and additive can be effected through the inventive structure.

Figure 18:
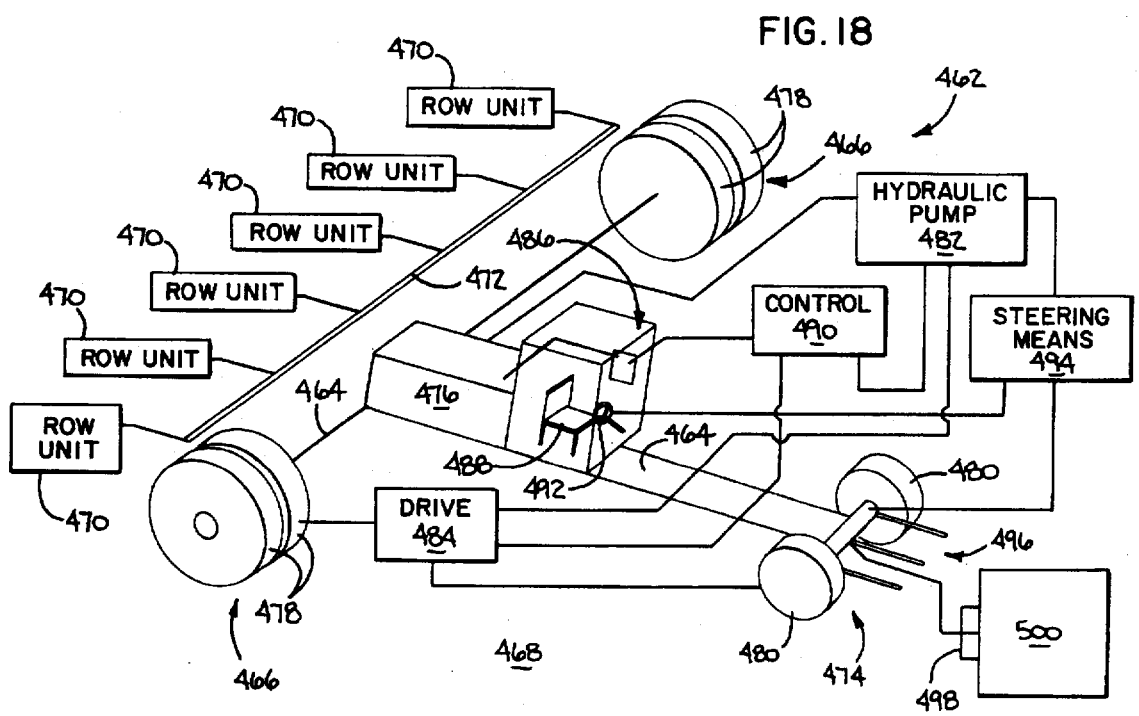
FIG. 18 is a perspective view of a self-propelled planter unit according to the present invention.

In another form of the invention, a self-propelled planter unit is shown schematically at 462 in FIG. 18. The planter unit 462 has a frame 464 with a wheeled carriage at 466 to allow the frame 464 to roll over underlying terrain 468. The planter unit 462 has laterally spaced row units 470 mounted in a trailing direction from a laterally extending towing bar 472.

A steerable front wheel assembly 474 is provided at the front of the frame 464.

An engine 476 drives at least one of the wheels 478 on the wheel carriage 466 and/or one or both of the wheels 480 on the front wheel assembly 474. Preferably, an hydraulic drive system is employed utilizing an hydraulic pump 482, operated by the engine 476. Hydraulic fluid from the pump 482 operates a suitable drive means 484.

A cab 486 is mounted on the frame 464 and has a seat 488 therein for an operator. A control 490 is provided within the cab 486 to allow the operator to control the engine 476 and the drive 484. A steering wheel 492 allows the operator to control an hydraulically actuated steering means 494.

The hydraulic pump 482 can be used to operate other accessories, such as those previously described i.e. the means 316.

According to the invention, a hitch assembly is provided at 496 and is preferably a three point hitch assembly as is connectable to a mount 498 on a conventional towing vehicle 500. With this arrangement, the user has the option of either using the planter unit 462 on its own, as a self-propelled vehicle, or drawing the planter unit 462 in use behind the towing vehicle 500, in a manner previously described for the prior embodiment. The advantage of having a self-propelled planter unit 462 is that the towing vehicle 500 is then freed to perform other tasks in the same field apart from the planter unit 462.

The planter unit 462 need not be made independently road worthy in that it can be towed on highways from field to field using the towing vehicle 500 as is conventionally done.

As seen in FIG. 3, removable protective covers/cowls, 502, 504 are provided over the containers 30, 32, 34. These covers 502, 504 shield the containers 30, 32, 34 to keep dust and debris away therefrom. Additionally, the covers 502, 504 contribute significantly to the appearance of the planter.

With the covers 502, 504 retracted, the operator can gain access to the containers 32, 34 by climbing a ladder 506 to gain access to a horizontal walkway 508, extending the width of the planter unit 10 between the containers 32, 34. The walkway 508 has three forward branches 510 which allow the user to access the laterally spaced containers 34 from either side thereof, and the container 30.

Another aspect of the invention is the provision of flanges (see FIGS. 2, 8 and 14) on the frame element 18 and like flanges 514 on the frame element 22 to permit releasable connection of separate planter units 516, 518. The planter units 516, 518 are the same as the planter unit 10, with the exception that no draw bar 40 is necessary.

The foregoing disclosure of specific embodiments is intended to be illustrative of the broad concepts comprehended by the invention.

I claim:

1. A planter row unit comprising:

a row unit frame comprising a first unitary plate pivotally attached at its upper end to a towing frame and extending downwardly from said pivotal attachment, at least one gauge wheel mounted on said row unit frame for rolling engagement with the surface of the soil, thereby controlling the elevation of said row unit frame, means for attaching a soil engaging component in an operative position on the first unitary rigid plate, first means cooperating between the towing frame that is movable in a forward towing direction and the first unitary rigid plate for attaching the first unitary rigid plate to the towing frame so that the first unitary rigid plate a) follows forward movement of the towing frame to which the first unitary rigid plate attaches and b) is movable vertically relative to the towing frame to which the first unitary rigid plate attaches to allow the first unitary rigid plate to move conformingly over uneven underlying terrain, a second unitary rigid plate and means for rigidly connecting the first and second unitary rigid plates to each other in assembled relationship while maintaining a space between the first and second unitary rigid plates for a supply conduit with the first and second unitary rigid plates in assembled relationship, and means for attaching a soil engaging component in an operative position on the second unitary rigid plate.

2. A planter row unit having a front and rear and a top and bottom and comprising a row unit frame comprising a first unitary rigid plate pivotally attached at its upper end to a towing frame and extending downwardly from said pivotal attachment, means for attaching to said first unitary rigid plate a soil engaging component selectively in one of first and second different positions spaced from each other in at least one of a fore and aft and vertical direction, at least one gauge wheel mounted on said row unit frame for rolling engagement with the surface of the soil, thereby controlling the elevation of said row unit frame, means for attaching a soil engaging component in an operative position on the first unitary rigid plate, and first means cooperating between the towing frame that is movable in a forward towing direction and the first unitary rigid plate for attaching the first unitary rigid plate to the towing frame so that the first unitary rigid plate a) follows forward movement of the towing frame to which the first unitary rigid plate attaches and b) is movable vertically relative to the towing frame to which the first unitary rigid plate attaches to allow the first unitary rigid plate to move conformingly over uneven underlying terrain.

3. A planter row unit comprising:

a row unit frame having a front and rear and a top and bottom comprising a first unitary rigid plate pivotally attached at its upper end to a towing frame and extending downwardly from said pivotal attachment, at least one gauge wheel mounted on said row unit frame for rolling engagement with the surface of the soil, thereby controlling the elevation of said row unit frame, means for attaching a soil engaging component in an operative position on the first unitary rigid plate, said first unitary rigid plate extending continuously over at least one half the distance between the top and bottom of the planter row unit, a second unitary rigid plate and means for rigidly connecting the first and second unitary rigid plates to each other in assembled relationship, said second unitary rigid plate having means thereon for attaching a soil engaging component in an operative position, a third unitary rigid plate with means for rigidly connecting the third unitary rigid plate to at least one of the first and second unitary rigid plates in assembled relationship, said third unitary rigid plate having means thereon for attaching a soil engaging component in an operative position, and a closing wheel to deposit soil over a seed slot in underlying soil as the row unit is advanced forwardly in a towing direction, and the means for attaching a soil engaging component on the third unitary rigid plate attaches the closing wheel to the third unitary rigid plate in an operative position.

4. A planter assembly comprising multiple planter row units attached to a common towing frame, each planter row unit comprising a row unit frame pivotally attached to said towing frame;

at least one gauge wheel carried by the row unit frame for rolling engagement with the surface of the soil, thereby controlling the elevation of the row unit frame;

multiple planting tools carried by the row unit frame and extending below the bottom of the gauge wheel for planting seeds in the soil;

the weight of each planter row unit being sufficient to cause said planting tools to penetrate hard soil; and biasing means connected between said towing frame and said row unit frame for applying a continuous upward force on the row unit frame to counterbalance a portion of the weight of the planter row unit and thereby control the depth of penetration of said planting tools into the soil.

5. The planter assembly of claim 4 wherein said biasing means is controllable so that said upward force can be adjusted according to the hardness of the soil being planted.

6. The new assembly of claim 4 wherein said biasing means is a controllable hydraulic cylinder.

\* \* \* \* \*